L. B. HARRIS.
INTERNAL COMBUSTION ENGINE.
APPLICATION FILED OCT. 16, 1912.
1,122,592.
Patented Dec. 29, 1914.
10 SHEETS—SHEET 10.
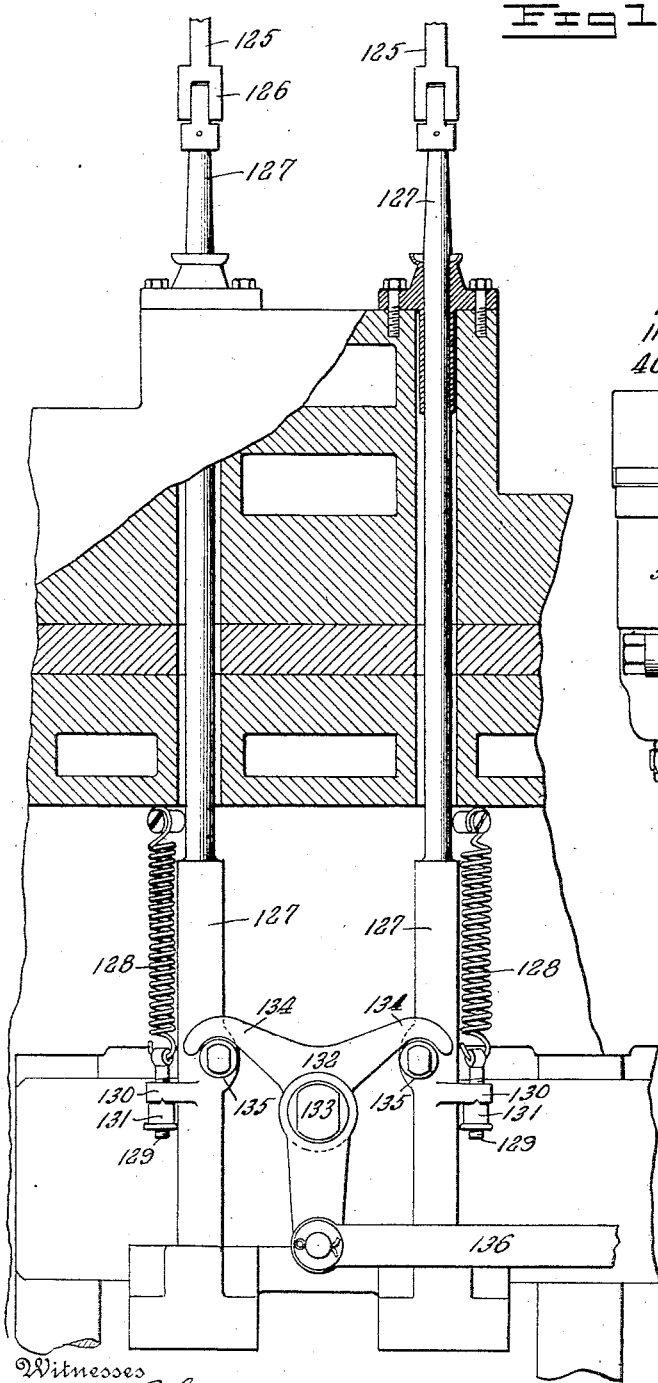
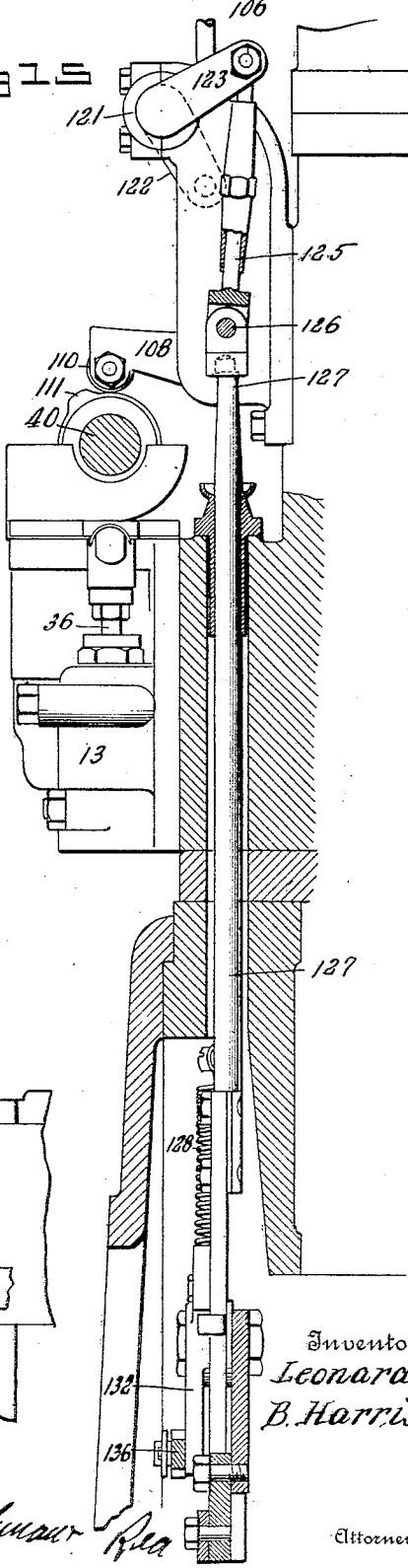
Inventor
Leonard B. Harris

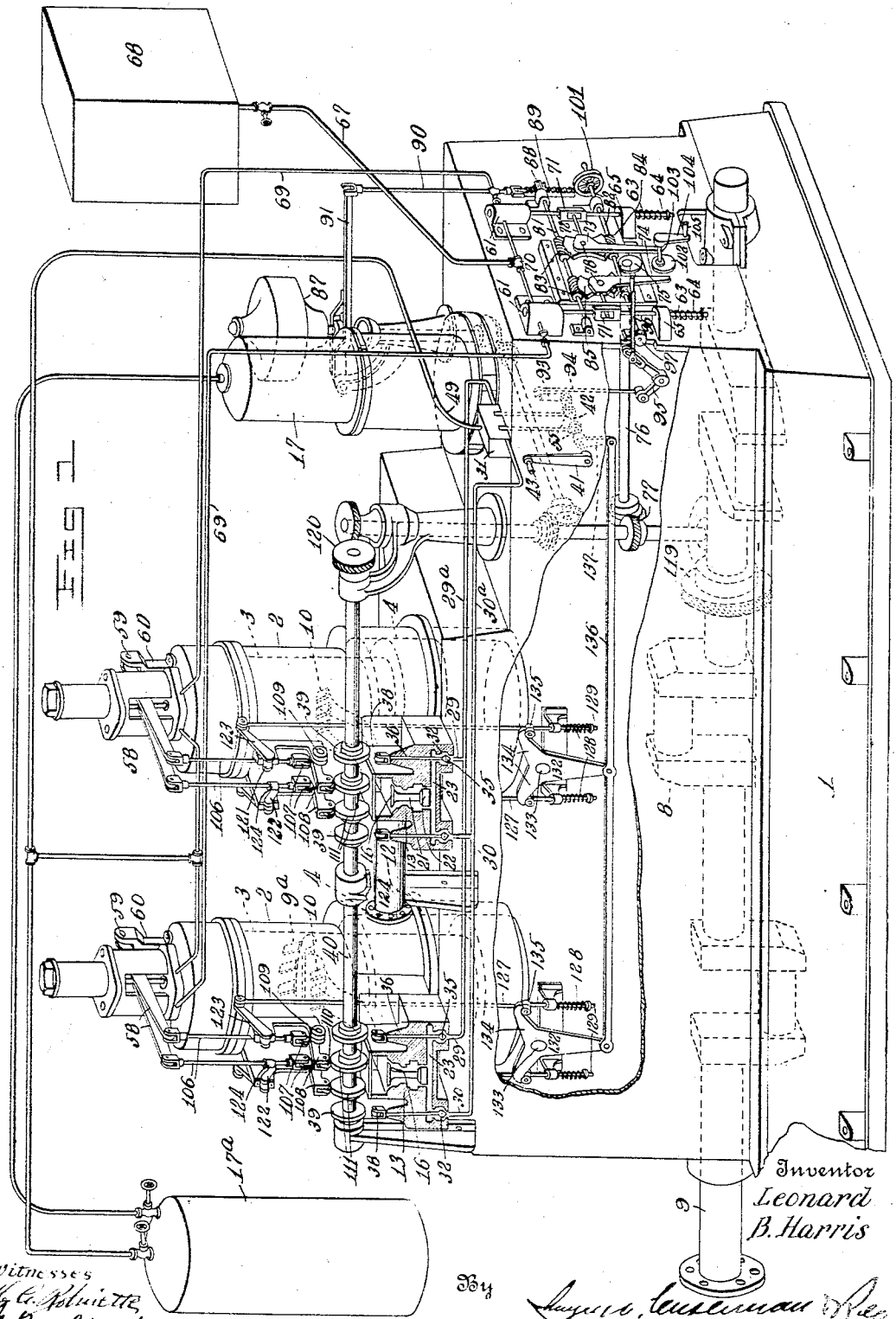

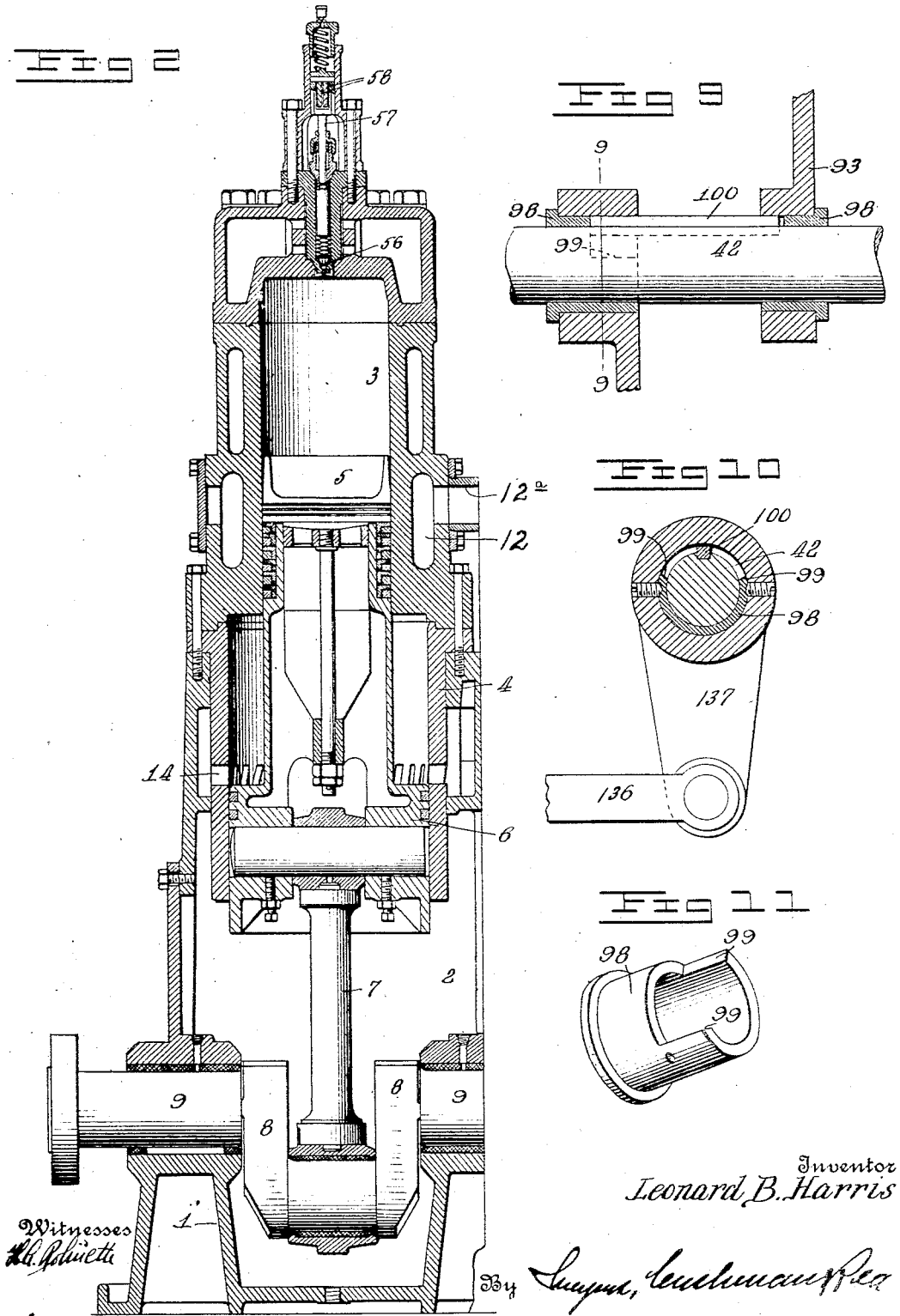

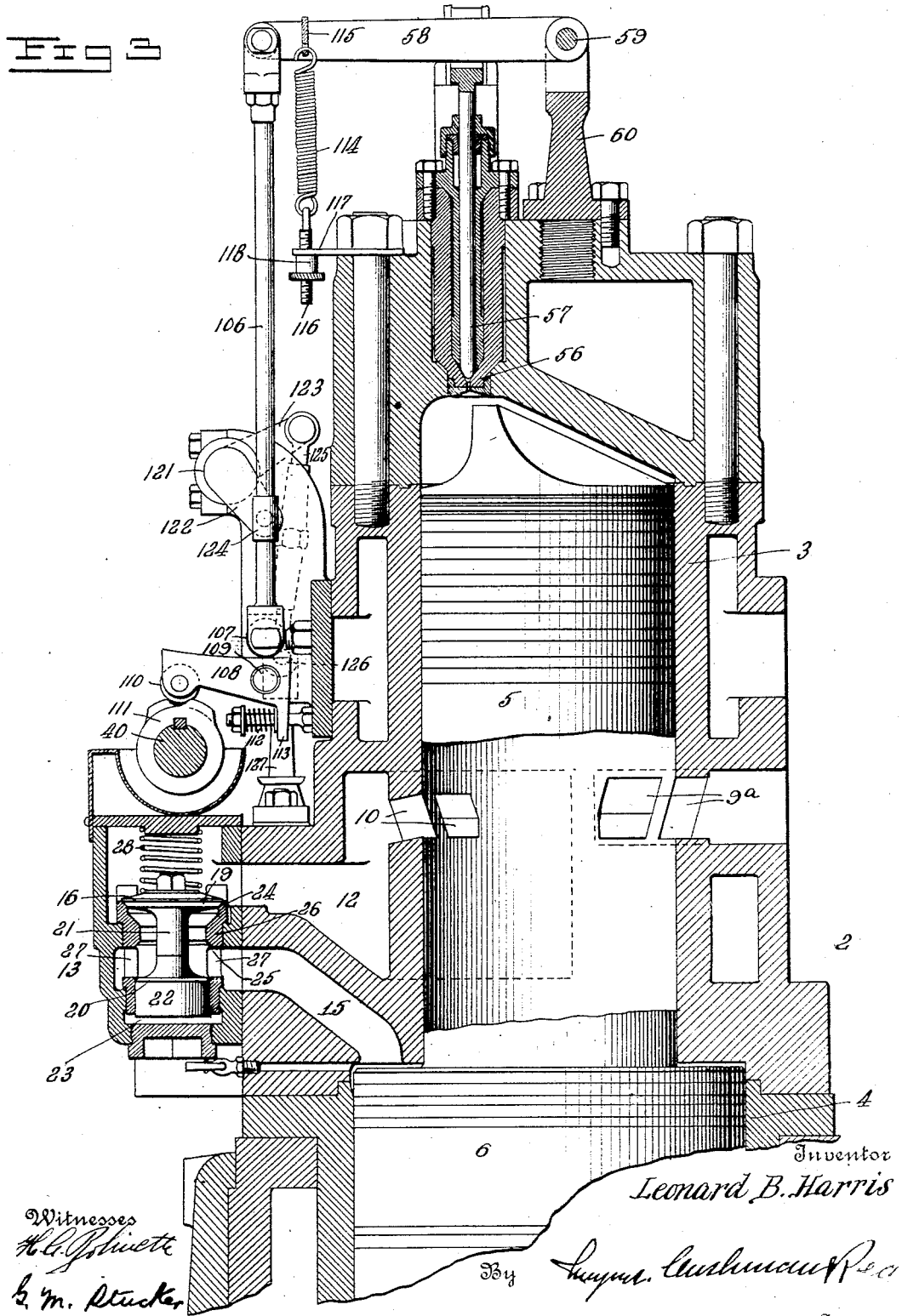

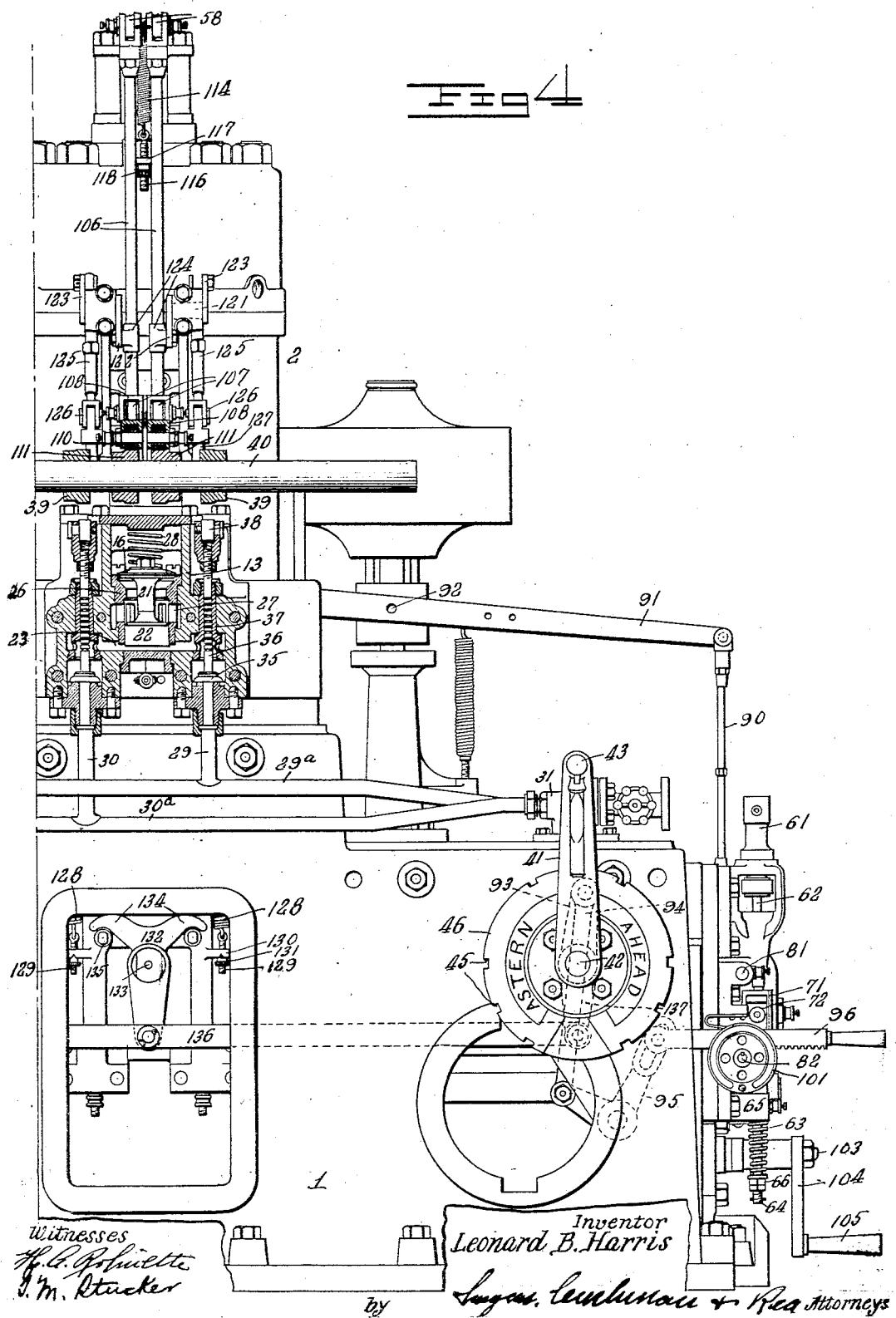

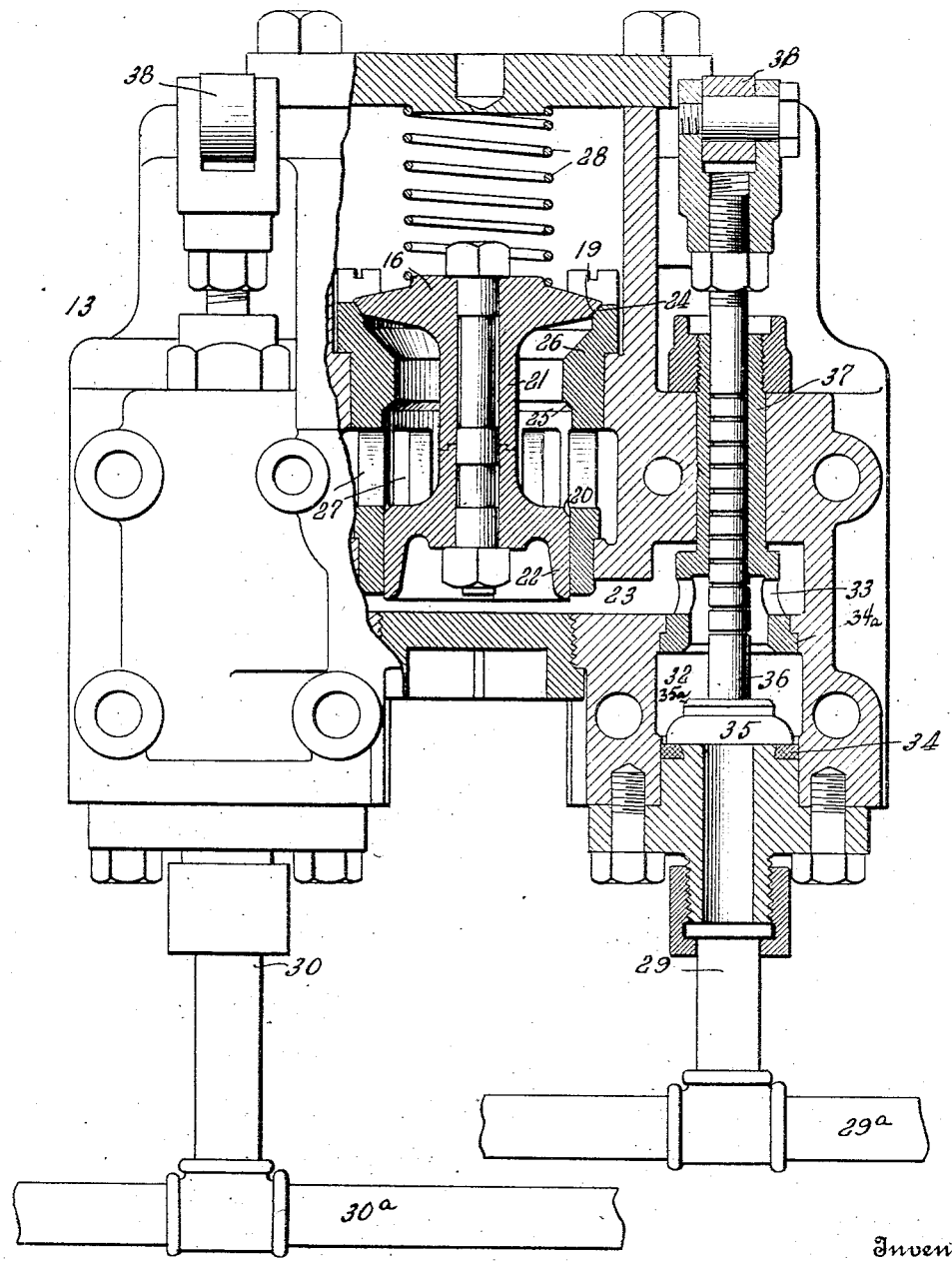

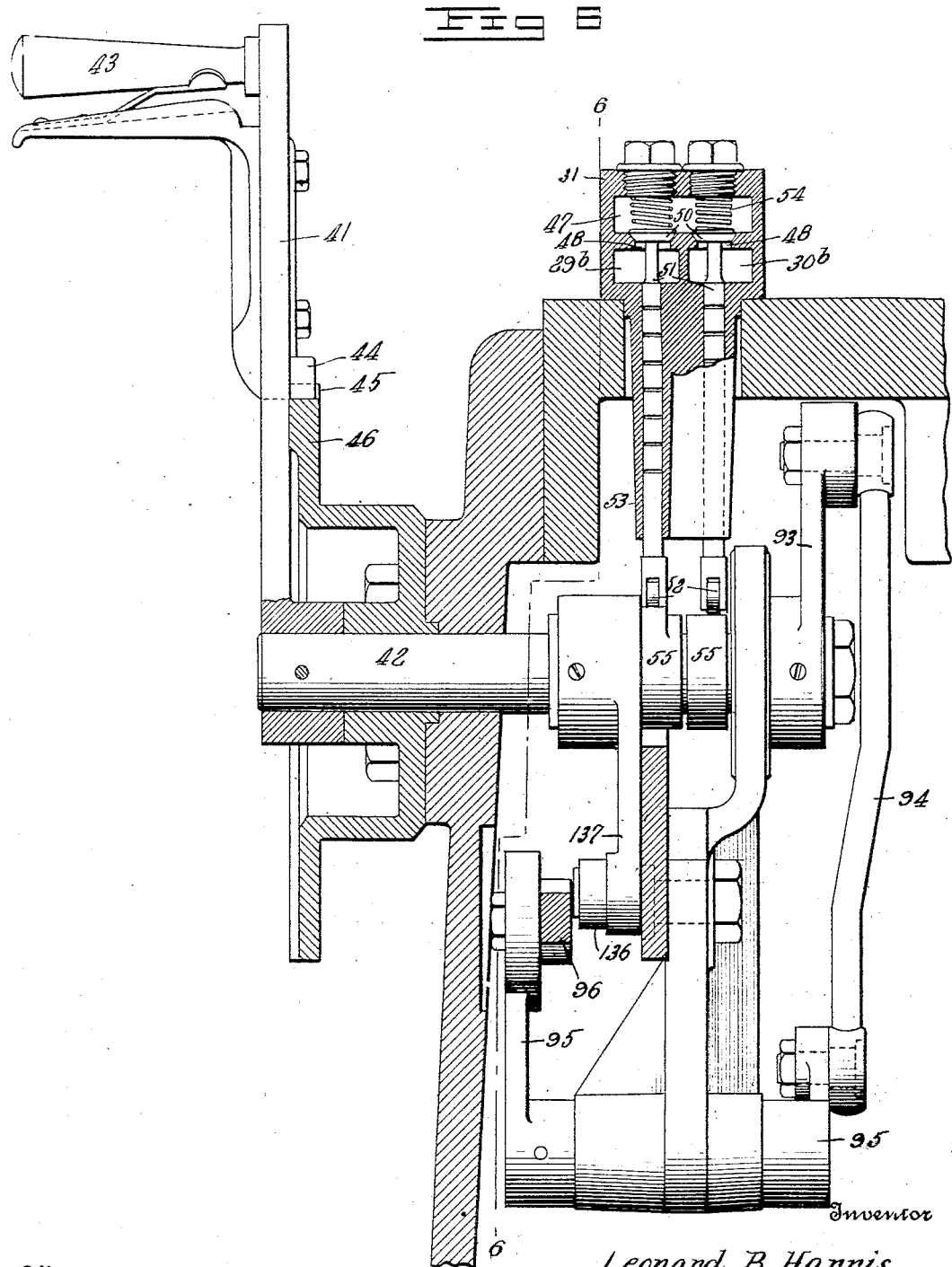

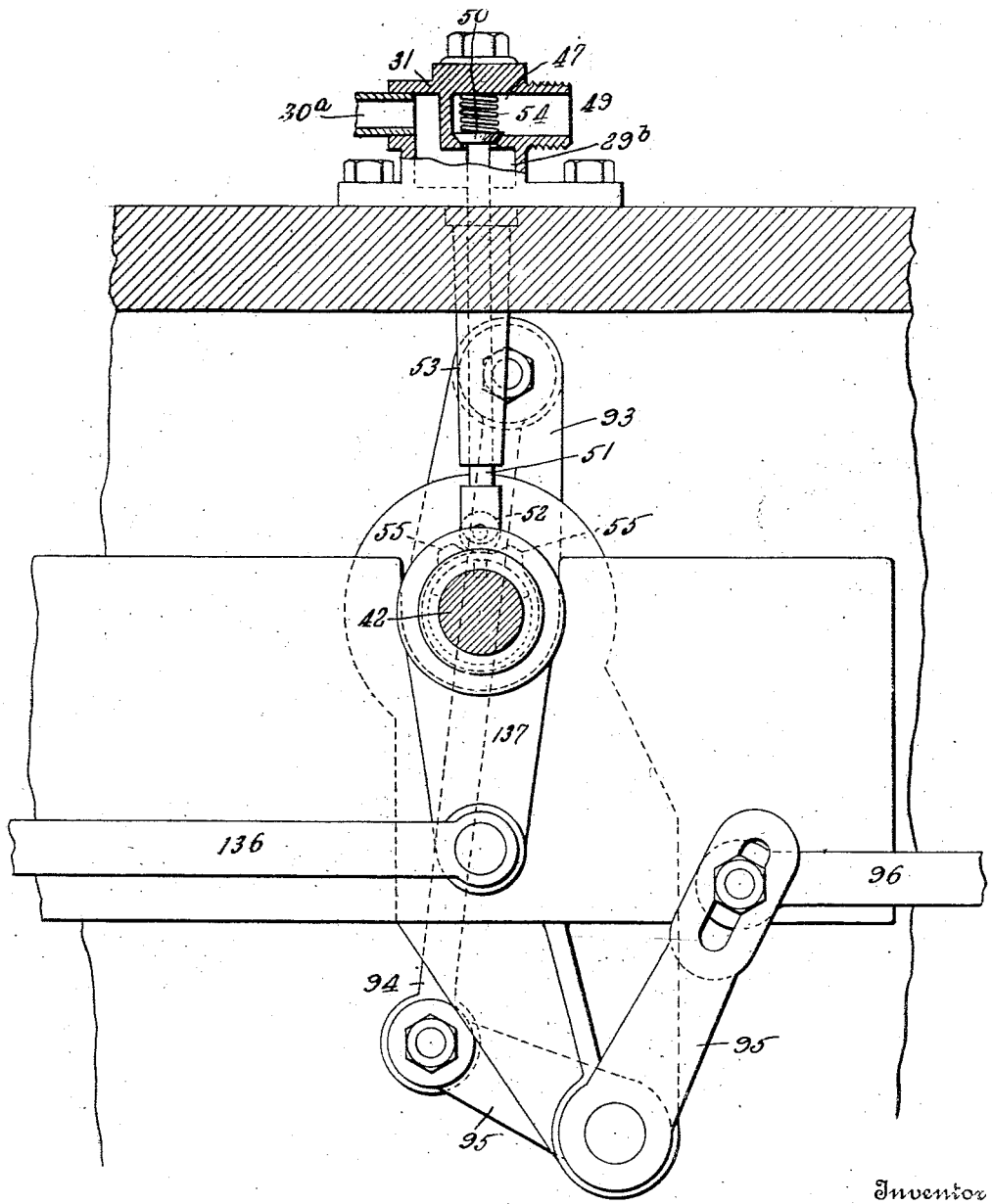

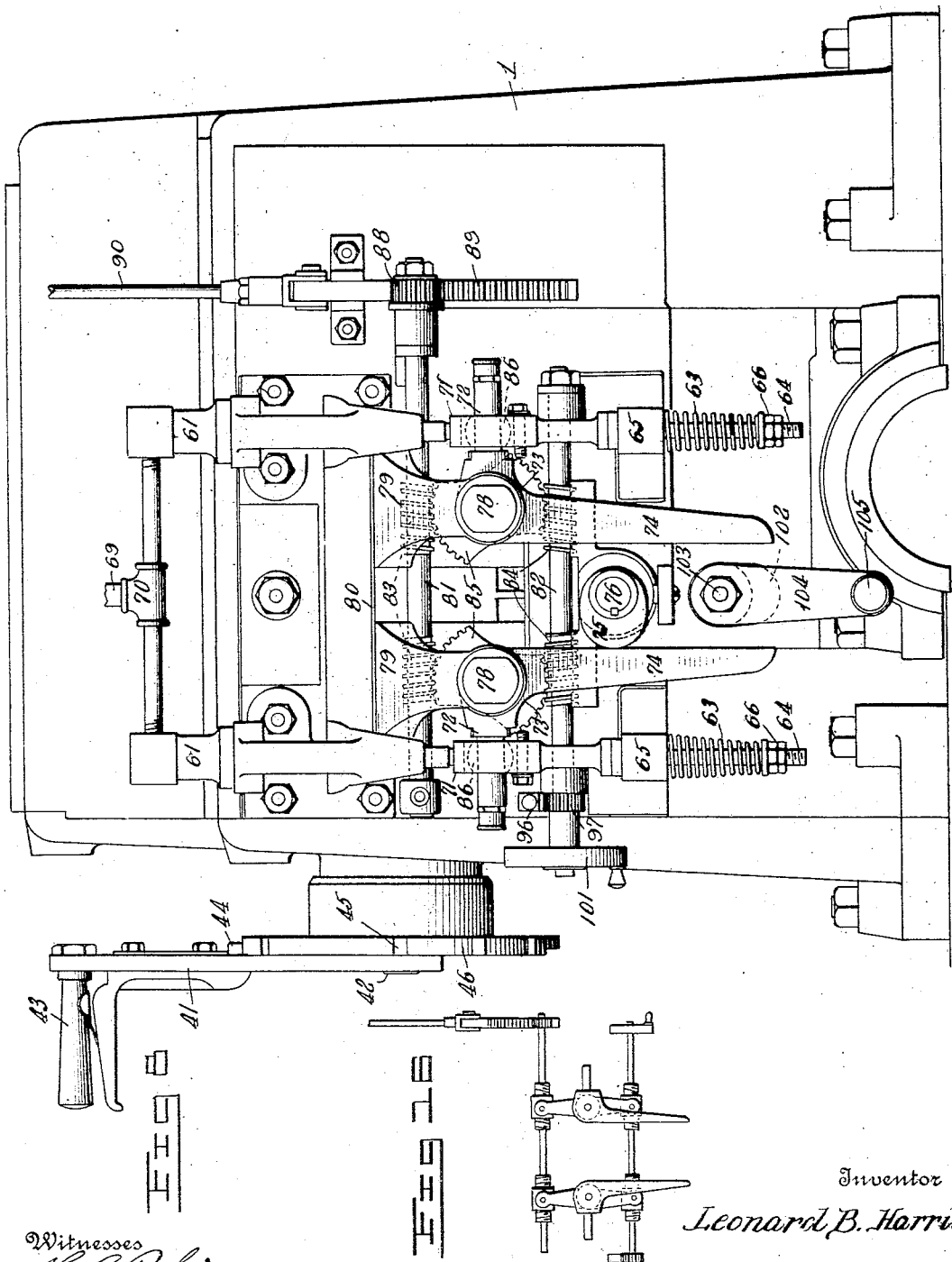

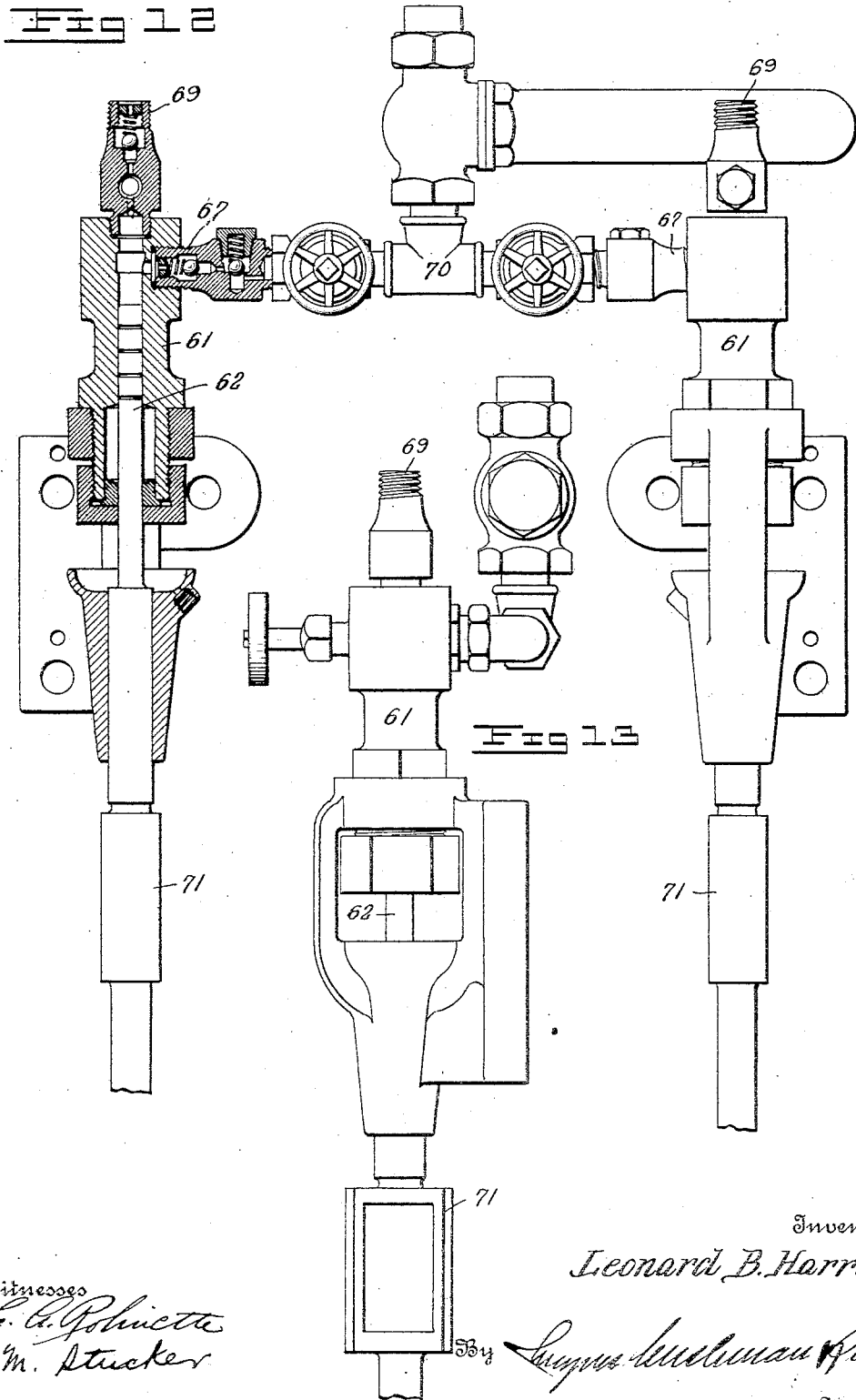

UNITED STATES PATENT OFFICE.

LEONARD B. HARRIS, OF WATERTOWN, NEW YORK.

INTERNAL-COMBUSTION ENGINE.

1,122,592.  Specification of Letters Patent.  Patented Dec. 29, 1914.

Application filed October 16, 1912. Serial No. 726,045.

*To all whom it may concern:*

Be it known that I, LEONARD B. HARRIS, a subject of the King of Great Britain, residing at Watertown, in the county of Jefferson and State of New York, have invented new and useful Improvements in Internal-Combustion Engines, of which the following is a specification.

My present invention relates to internal combustion engines and more particularly to that type more commonly known as the Diesel engine, wherein air is highly compressed in the power cylinder or cylinders, which compression brings it to a high heat and then injecting or spraying a charge of fuel oil into the compressed and heated gases to ignite the same and cause combustion thereof which serves to drive the pistons outward in their cylinders, and the invention has for its objects to greatly simplify and improve engines of this type by introducing therein certain novel features of construction and operation calculated to materially increase the efficiency of the engine and place the same under the absolute control of the operator.

One object of the invention is to provide for the utilization of the scavenging cylinders and their associated pistons, as air motors to be employed in initially starting the engine under air pressure derived from a suitable source of supply, whereby the said cylinders and pistons will perform the dual functions of initially starting the engine and subsequently furnish scavenging air to the working cylinders.

Another object of the invention is to provide a novel construction and arrangement of pumping means for feeding the fuel oil to the working cylinder or cylinders of the engine, said pumping means being readily adjustable at the will of the operator to feed the fuel in properly regulated quantities and said pumping means being also under automatic control of the engine governor.

Another object of the invention is to provide a simple construction and arrangement of manually operable controller and associated devices common to both the air starting motor and the fuel feeding means, whereby the engine shaft may be driven either "ahead" or "astern" at the will of the operator, and whereby, in initially starting the engine by means of the air motor or motors, no fuel oil will be introduced into the working cylinder or cylinders.

Still another object of the invention is to provide a hand-operated pumping arrangement associated with the fuel pumping means, but which is operable independently of the manual control lever, whereby the operator may manipulate the fuel pumps at will to feed fuel oil to the working cylinder or cylinders.

The invention has for a further object novel means associated with the fuel atomizer of each engine cylinder for controlling the operation of the atomizer to cause the engine shaft to run in either direction, said means being operatively connected with the manual control lever of the engine.

The invention has for its objects certain other more or less important features all of which will be set forth in detail in the accompanying specification.

In order to enable others skilled in the art to understand, make and use my said invention I will now proceed to describe the same in detail, reference being made for this purpose to the accompanying drawing which is illustrative of one embodiment of the invention, and wherein—

Figure 1 is a diagrammatic perspective showing a two-cylinder engine built according to my invention, certain parts being shown in section and others broken away for clearness of illustration. Fig. 2 is a vertical section through one of the cylinders and its piston. Fig. 3 is an enlarged vertical section through the upper part of one of the cylinders, the valve mechanism being shown in section, said section being taken at right angles to Fig. 2. Fig. 4 is a side elevation of a portion of the engine, the valve mechanism being shown in vertical section. Fig. 5 is an enlarged vertical section of the valve mechanism for controlling the scavenging air. Fig. 6 is a side elevation partly in section on an enlarged scale of the manual control lever showing certain of the operative connections with other parts of the engine. Fig. 7 is a transverse vertical sectional view of the same parts taken on line 6—6 of Fig. 6. Fig. 8 is a front elevation of the fuel-feed pumps and operating mechanism therefor. Fig. 9 is a detail longitudinal section of the control lever shaft showing the lost-motion connection with its levers. Fig. 10 is a section on the line 9—9 of Fig. 9. Fig. 11 is a detail perspective view of the bushing carried by the control lever shaft. Fig. 12 is a detail sectional view of one of the fuel-feed pumps. Fig. 13 is a side elevation of the same. Fig. 14 is a front elevation of the oil feed atomizer valve controlling and operating mechanism. Fig. 15 is a side elevation of the same. Fig. 16 is a front elevation of a slightly modified construction of fuel feed pump controlling means.

In the accompanying drawings and the following description I have elected to illustrate and describe the invention as embodied in a two-cylinder engine of the reversible type, but obviously by improvements may be embodied in an engine of the straight away or non-reversing type having more or less cylinders without departing from the spirit of the invention, the present showing being merely by way of illustration.

Referring to the accompanying drawings wherein like reference numerals indicate the same parts throughout the several views, the numeral 1 designates the base member or casting of the engine, which as above indicated may be suitably designed for any number of cylinders depending upon the horse-power required to be developed, and upon this base-member the engine cylinder or cylinders 2 are mounted, two such cylinders being shown in the present instance. Inasmuch as the cylinders, valve mechanism, fuel feeding pumps and other necessary parts for the several cylinders are identical in construction, a description of one set of these mechanisms will suffice for all.

As more clearly illustrated in Figs. 2 and 3, the engine cylinders are of stepped form, that is to say, each cylinder has alined bores of different diameter, the smaller bore 3 being the power or working cylinder of the engine and the larger bore 4 being the scavenging cylinder and compressed air motor starting cylinder combined. Within these two cylinders is fitted a stepped piston having heads 5 and 6 corresponding in diameter to the bores 3 and 4, respectively, the head 5, being the working or power piston and the head 6, being the combined air starting and scavenging piston. The connecting rod 7 of each piston is connected by a crank 8 to the engine shaft 9 in the usual way, all as illustrated in Fig. 2.

Each power cylinder 3 of the engine is provided with the usual exhaust ports 9$^a$ for the spent gases, and with intake ports 10, both of which ports are arranged in the side walls of the engine cylinder, and are covered and uncovered at proper intervals by the piston head 5. Each scavenging or pump cylinder 4 is provided with ports 14, which serve as the exhaust ports for the starting air when the engine is started by compressed air, and which also serve as the inlet ports for the scavenging air when the engine is running under fuel power, the said ports 14 being covered and uncovered at proper intervals by the piston head 6.

By arranging the air inlet ports 10 and the exhaust ports 9$^a$ in the side walls of the power cylinders, which ports are covered and uncovered at the proper intervals by means of the pistons working in their power cylinders in the manner just stated, I am able to dispense with separate inlet and exhaust valves and their operating mechanisms such as now usually employed in engines of this type, and I thus overcome entirely the well-known objections arising from the use of such valves. These valves being usually located in the cylinder heads are the source of much trouble in engines of this class owing to the fact that the excessive heat resulting from the highly compressed air within the working cylinders soon distorts the metal heads of the cylinders to such an extent as to render proper seating of the valves almost impossible, and often results in sooner or later cracking the cylinder heads and thus putting the engine out of commission. Each power cylinder is also provided with an annularly arranged compressed air chamber 12, Figs. 2 and 3, which has communication with a valve casing 13 within which is mounted my improved fluid actuated valve mechanism presently to be described, said air chamber 12 having communication by means of the ports 10 with the lower portion of the power cylinder 3, said ports being adapted to be uncovered when the piston 5 is in its lowermost position in order to admit compressed air from the chamber 12 into the power cylinder for scavenging purposes. When the engine has two or more cylinders, as in the present showing, I prefer to connect the air chambers 12 of two adjacent cylinders, as by means of a manifold 12$^a$, Fig. 2, wherein one end of such a manifold is shown connected directly to one of the engine cylinders, the other end being open for connection with an adjacent cylinder. The chamber 12 has communication with one end of the pump cylinder 4 above the piston 6 by means of a passage 15, Fig. 3, which passage is controlled by a fluid actuated valve mechanism in the valve box 13, this valve mechanism including a delivery valve 16 that operates automatically by the pressure of air behind it to admit a supply of scavenging air under pressure into the chamber 12 at each upstroke of the piston 6 and immediately closing to its seat as the piston begins to move on its downstroke; the scavenging air from the compressed air chamber 12 passing through the ports 10 into the power cylinder 3 as soon as the ports are uncovered by the piston head 5, thereby forcing the spent gases out of the cylinder through the exhaust ports 9$^a$ and thoroughly cleaning the cylinder and leaving therein a fresh charge of air to be compressed. This is the operation of the valve 13 under normal working conditions, as when the engine is running under its own power, but as will be presently described the fluid actuated valve mechanism operates differently in initially starting the engine under compressed air.

In the normal operation of the engine the scavenging air compressed on the upstroke of one of the step pistons 6 is delivered through the delivery valve 16 into the annular space 12, which space it will be understood, is common to two adjacent engine cylinders. Consequently as one of the working or power pistons is on the downstroke at the same time that an adjacent step piston is compressing into the space 12, it will be apparent that the air delivered by the one step piston is used to scavenge the next or adjacent power cylinder and vice versa.

I will now describe my improved fluid actuated valve mechanism that is associated with each of the engine cylinders, and which enables me to utilize the scavenging pump as an air motor on its outward or downstroke only for initially starting the engine by compressed air derived from some suitable source of supply, such for instance as from an air compressor 17 or suitably connected air bottle 17ª, the piston 6 performing its regular function of compressing air through valve 16, on its inward or up stroke even while air starting. As I have elected to show my improvements associated with an engine of the reversible type this fluid actuated valve mechanism is in the present instance designed to deliver the compressed air to the scavenging pumps of the proper cylinders in order to drive the engine shaft either "ahead" or "astern" as desired, depending upon the direction of movement of the controlling lever.

Referring more particularly to Figs. 1, 3, 4, and 5, it will be seen that there is a valve casing 13 attached to the side of each engine cylinder, and that there is a delivery valve 16 in each casing, the said valves 16 each having an annular seating face 19 that coöperates with a seat 24 formed in a bushing 26, the latter having an annular series of ports 27 that lead to the passage 15, and thus establish communication between the casing 13 and the scavenging or starting pump cylinder 4. Beneath the valve 16 and also located within the valve box and connected to the valve 16 as by a stem 21, is a fluid-actuated piston valve 22, which for the purpose of this description I will term an "intercepting" valve, the upper rim of the piston valve 22 being provided with an annular seating face 20 that coöperates with a valve seat 25 also formed in the bushing 26 as clearly shown in Fig. 5. The lower end of the piston valve 22 is exposed in a passage 23 where it may be acted upon by air pressure from the said source of supply to lift the valve at proper intervals so as to bring the seating face 20 into contact with the seat 25 and close off communication between the passage 15 and the compressed air chamber 12 when the engine is being started under compressed air power or in other words, blocks exit of starting air from the scavenging cylinder 4 through the delivery valve 16 and renders same inoperative, and compel it to act upon the piston 6, as will be presently explained. The valve 16 is normally held to its seat 24 by means of a coiled spring 28, acting upon the top of the valve as more clearly shown in Fig. 5, which shows the valve in its normal position. From the foregoing it will be seen that the valve 16, as well as the piston valve 22, is fluid actuated and has two seating positions, and also performs two functions, namely when operating under fuel power the valve 16 is lifted from its seat under the impulse of the compressed air from the scavenging cylinder 6 sufficiently to admit the air compressed on the upstroke of the piston through the ports 27 into the compressed air chamber 12, the valve lifting at each upstroke of the scavenging piston 6. The air cannot pass down into the passage 23 owing to the piston valve 22. When the engine is to be started under compressed air power as will presently be explained, which compressed air is admitted into the passage 23, where it can act upon the piston valve 22, the seating face 20 is brought up tight against the seat 25 and closes the passage leading to the compressed air chamber 12, but allows the compressed air to pass beneath the piston valve 22, through the ports 27 and passage 15 into the scavenging cylinder 4 above its piston to drive the latter outward and thus rotate the crank shaft 9. This briefly is the action of the intercepting valve 22 when the engine is being started under compressed air power. Thus the scavenging pumps of the various engine cylinders may be employed initially as compressed air motors for starting the engine. The compressed air in the chamber 12 remains in said chamber under pressure until the piston 5 on its downstroke uncovers the ports 10 whereupon the air from the chamber, which is under compression, rushes into the power cylinder 3 for scavenging the latter.

In order to admit a charge or supply of compressed air into the passage 23 below the piston end 22 of the intercepting valve when initially starting the engine under compressed air power, the valve casing 13, in an engine of the reversible type, is provided with two compressed air inlet pipes 29, 30, leading respectively from conduits 29ª and 30ª, which conduits terminate in a valve box 31 Figs. 1, 6 and 7, presently to be described. The conduit 29ª with its inlet pipes 29 leading to the valve casings 13 of the various engine cylinders are for furnishing compressed air to start the engine running "ahead" and the conduit 30ª with its inlet pipes 30 which lead to the valve casings 13 of the engine cylinders furnish starting air for running the engine "astern," it being understood that the two conduits with their inlet pipes are employed only in an engine of the reversible type. Each of the inlet pipes 29 and 30 leads to a valve chamber 32 of which there are two such chambers formed in each valve casing 13, the chambers being located on opposite sides of the fluid actuated intercepting valve, as more clearly shown in Figs. 1 and 5, and each chamber communicates by means of ports 33 with the cross passage 23; the latter opening at its opposite ends through the ports 33 into the chambers 32. Within each valve chamber 32 are two opposed valve seats 34 and 34ª with which coöperate a double seating controller valve 35 having a seating rim 35ª to coöperate with the seat 34ª, the lower rim of the valve 35 normally seating upon the seat 34. Each valve 35 is mounted upon a vertically moving valve stem 36, working freely in a bushing 37, and each valve stem 36 carries a roller 38 at its upper end, as more clearly shown in Fig. 5; the said rollers being normally out of the path of movement of, but arranged to be brought into position to be engaged by one or the other of the two cams 39 on the cam shaft 40 of the engine when the valve stems 36 are lifted under the influence of starting air passing through either of the conduits 29ª or 30ª and their pipe connections 29, 30 with the chambers 32 in which the valves 35 are located. One of the cams 39 which I will term the "go ahead" cam is so set relatively to the cranks 8 of the engine shaft 9 to run the engine "ahead" and the other of said cams which I will term the "go astern" cam is set properly, relatively to the first indicated cam and its crank for running the engine "astern" as will presently appear. It will be understood that in a reversible engine there is one "go ahead" and one "go astern" cam associated with each engine cylinder and likewise there is one "go ahead" and a like "go astern" valve 35, coöperatively associated with the two cams respectively of each cylinder, one or the other of the two sets of valves being brought into operation depending upon whether the engine is started running "ahead" or started running "astern."

The controller valves 35 located on one side of the intercepting valves 22, of the valve casings 13 and which I will term the "go ahead" set, are employed to admit compressed air successively to the passages 23 and from thence to the pump cylinders 4 when it is desired to drive the engine in one direction, as for instance "ahead" when starting under air pressure, and the other valves 35 located on the opposite side of the intercepting valves in the several valve casings and which I will term the "go astern" set, are employed for a similar purpose when it is desired to drive the engine in the opposite direction, as for instance "astern." All the valves of one or the other of the two beforementioned sets of valves will be raised from their lower seats 34 toward their upper seats 34ª by the impact of the compressed air passing through the conduit 29ª or the conduit 30ª depending upon the position of the manual control lever, which will now be described, it being understood, that when the valves 35 of one set are being lifted those of the other set will be held to their seats by their own weight and the pressure of air above them to prevent the air from one of the conduits as 29ª from passing across to the other conduit as 30ª, or vice versa. While all the valves of one or the other of the two sets are lifted from their lower seats 34, toward their upper seats 34ª by the pressure of the starting air behind them, one of the valves of the set so lifted will be prevented from reaching its seat in the manner and for the purpose presently to be described.

The manual control lever which is more clearly illustrated in Figs. 4, 6, and 7, comprises an arm 41 mounted upon a shaft 42, the said arm having a handle member 43 and a locking dog 44, which dog is adapted to take into one or the other of a series of notches 45 formed in the periphery of the dial plate 46, said notches indicating the position to which the control lever should be moved to first deliver compressed air to the scavenger or step cylinders and thereafter deliver fuel oil to the power cylinders, the amount of fuel oil delivered depending upon the position of the lever. By moving the lever in one direction, as for instance to the right, the engine will be driven "ahead," and by moving the lever to the left the engine will be driven "astern."

As before indicated the compressed air conduits 29ª and 30ª lead from a valve box 31 mounted directly above the shaft 42 of the control lever, said valve box being divided by suitably arranged partitions into three chambers, two of which 29ᵇ and 30ᵇ communicate with the conduits 29ª and 30ª respectively and the other of which 47, is common to the conduits 29ᵇ and 30ᵇ, and has communication therewith through valve controlled openings 48. Compressed air is admitted to the chamber 47 through an inlet 49 leading from some suitable compressed air source, such for instance as the air compressor 17 associated with the engine or from the air bottle 17ª.

Associated with each of the openings 48 in the valve box 31 is a cut-off valve 50 each mounted upon a stem 51, said stems each carrying a roller 52 at its lower end and the stems moving freely in bushings 53. The valves 50 are normally held to their seats by coiled springs 54, said springs also serving to force the rollers 52 into the path of rotation of the cams 55 mounted upon the shaft 42, the arrangement being such that when the control lever is moved for instance to the right, a distance sufficient to bring the locking dog 44 into engagement with the first notch 45 on the dial, one of the cams 55 will lift the valve 50 to admit a supply of compressed air to the conduit 29ª, which compressed air will immediately act upon the set of "go ahead" valves 35 that overlie the pipes 29, in the two valve casings 13, and move the seating faces 35ª of the several valves off their seats 34. In a two cylinder engine such as herein shown, one of the set of "go ahead" valves will be able to close to its seat 34ª because the tooth of its associated "go ahead" cam 39, will be out of contact with the roller 38, of its stem 36, on which the valve is mounted. The other "go ahead" valve 35 that is associated with the adjacent engine cylinder will, however, be held open on account of the roller 38, on its stem 36, engaging the tooth on the other "go ahead" cam 39 and the compressed air will then pass the valve 35, thus held open and enter the passage 23, where it can act on the intercepting valve 22. This valve will thus be lifted by the pressure of the air acting upon its piston to bring its seating face 20 into contact with the seat 25, preventing compressed air from passing into the chamber 12 but compelling it to pass on under the valve 22 through ports 27, passage 15, and into the cylinder 4 where it will act upon the piston head 6 forcing it downward or outward to drive the engine shaft ahead. Immediately the tooth of the "go ahead" cam 39, that has been held open moves sufficiently to allow the rim 35ª of said valve to close to its seat 34ª under the influence of the starting air behind it, entrance to passage 23, of this valve mechanism will be shut off, but the intercepting valve 22, will remain on its seat 25, until the compressed air in the associated cylinder 4, exhausts out through ports 14, whereupon the valve 22 will immediately fall to its normal position making it possible for the piston 6 to discharge its regular charge of scavenging air through valve 16, on the return stroke of said piston, into the chamber 12. This action takes place successively in the fluid actuated valves of the several engine cylinders, and continues so long as the control lever is allowed to remain in its first notch or compressed air starting position, and until the engine gains sufficient momentum, when the lever is moved to the next notch position, whereupon fuel oil will be delivered successively into the power cylinders 3 and the engine will then continue to run under its own or fuel power. Immediately the control lever is moved from the first notch position on the dial, which is the compressed air starting position, to the second notch position, which is the first fuel supply position, the cam 55 will move past the roller 52 of the valve stem 51, which will allow the valve 50 to move to its seat, thus cutting off the compressed air supply, and immediately the compressed air supply is cut off the intercepting valves 22 with their delivery valves 16 will assume their normal position which in the case of valve 22 is to open communication between the passages 15 and valves 16, but it will be understood that said valves 16, will then lift successively during each compression stroke of the pistons to deliver scavenging air from the scavenging cylinders through the passages 15 into the compressed air chambers 12, and from thence into the power cylinders when the ports 10 are uncovered by the pistons 5.

According to my invention, when initially starting the engine under compressed air power, there will be no delivery of fuel-oil to the power cylinders through their atomizers, as the first or initial movement of the control lever is what might be termed an idle movement, so far as the delivery of fuel-oil to the power cylinders and the opening of the atomizer-valves is concerned, as will hereinafter more fully appear.

By moving the control lever in the opposite direction or to the left, as viewed in Fig. 1, the same operation will take place as that just described, except that the engine will in this case be driven "astern" instead of "ahead". When the control lever is moved in one direction, as to the right the compressed air supply as heretofore indicated passes through conduit 29ª, pipes 29 leading to one set of "go ahead" valves 35, and from thence under the intercepting valves 22 into the cylinders 4 successively above their pistons 6 to drive the engine "ahead", and when the control lever is moved in the opposite direction, as to the left, the compressed air passes through the conduit 30ª, pipes 30, to lift the other set or "go astern" valves 35, and from thence successively under the fluid actuated intercepting valves 22, which are lifted as before, into the engine cylinders 4 above their pistons 6 to drive the engine "astern". It will be understood, of course, that each of the conduits 29ª and 30ª deliver compressed air to the fluid actuated valve mechanisms of all the cylinders of the engine, the intercepting valves operating successively to deliver compressed air from the source of supply first to one scavenging cylinder and then to the other.

The operations of starting, running under fuel power, and reversing will now be briefly described.

Let it be assumed that the engine is at rest in which case the control lever will be in its neutral position. To start the engine "ahead" under air pressure, the control lever 41 is moved to the right and brought to rest at the first notch position on the dial 46. This movement causes one of the cams 55, on the shaft 42 of the control lever to act upon valve stem 51, move the latter longitudinally and open the valve 50, in valve casing 31, Fig. 6. Compressed air from air bottle 17$^a$, is led into chamber 47, of the casing 31, by pipe 49, and normally maintains a supply of air therein. Immediately the valve 50, is lifted in the manner stated, compressed air from the chamber 47, passes into chamber 29$^b$, thence through conduit 29$^a$ and pipes 29, where it acts upon the set of "go ahead" valves 35 located at one side of the intercepting valves 22, to lift the said valves, and move their seating faces 35$^a$ toward seats 34$^a$. If the tooth on one of the "go ahead" cams 39, on cam shaft 40 is in a position to be engaged by the roller 38 on one of the valve-stems 36, it will not be possible for seating face 35$^a$ of one of the valves 35 to reach its seat 34$^a$ and this valve will be held open sufficiently to admit the compressed air from pipe 29, through ports 33, into passage 23, of one of the engine cylinders where it can act upon the piston 22, of the associated fluid-actuated intercepting valve, Figs. 4 and 5, lifting the same to cause seating face 20 thereof to contact with seating face 25, and cut off communication between passage 15 and chamber 12, Fig. 3. This will compel the compressed air to pass out through ports 27, the piston 22, of the fluid-actuated valve being of such a length that when valve face 20, is on its seat 25, the ports 27, will be open beneath the piston 22, allowing the air to pass into passage 15 and from thence into the associated cylinder 4, against the piston 6, Fig. 3, driving the latter downward or outward to rotate the engine shaft 9, through crank 8, as shown in Fig. 2. During this operation the air in passage 23, is blocked from passing out through pipe 30, by the associated "go astern" valve 35, which is held to its seat 34, by its own weight and the pressure of air above it. Immediately the tooth of the "go ahead" cam 39 allows the valve seating rim 35$^a$ of the open "go ahead" valve 35 to close onto its seat 34$^a$, under the influence of the starting air behind said valve, thus shutting off further supply of starting air into passage 23, of one engine cylinder, the intercepting valve 22 will remain on its seat 25, only until the compressed air in the associated cylinder 4 exhausts out of ports 14, when said valve 22 will fall to its normal position as shown in Fig. 5, making it possible for piston 6, to discharge its regular charge of scavenging air through delivery valve 16, on the return stroke of the piston into the chamber 12. When the engine has more than one cylinder, as in the present showing, and the starting air cannot enter the ports 33, and passage 23 of the first cylinder, by reason of the tooth of the cam 39, not being in position to engage the roller 38, on the valve stem 36, consequently allowing valve face 35$^a$ to seat on valve seat 34$^a$ and being held there by the air pressure in the chamber 32, thus preventing the further passage of air into passage 23, it will flow along through conduit 29$^a$ until it reaches a "go ahead" valve 35 associated with one of the other cylinders that is held open by its cam 39, and the engine will be initially started from this cylinder, it being understood that immediately the engine shaft 9, begins to turn, the cam-shaft 40, will also turn by reason of its gear connections 119, 120, and the starting air will then be admitted to the several cylinders in succession, the cams on the shaft 40, being set in the same relative position to each crank 8, and in sequence with each other. The engine continues to run in this manner under starting air until sufficient momentum is attained whereupon the control lever 41, is moved "ahead" to the next notch position on the dial, which immediately cuts off the supply of starting air by bringing valve 50, to its seat and simultaneously bringing the fuel pumps and atomizers into operation.

During air starting the working pistons 5, of the several cylinders are of course compressing air in their respective cylinders 3, and immediately the control lever is moved to the second notch position on the dial 46, Fig. 4, a charge of fuel oil will be fed into the proper cylinder by lifting of its atomizer valve 57, through lever 58, rod 106, rocker 108, and cam 111, it being understood that the cams 111 are positioned on their shaft 40 to actuate the proper atomizer valve at the right moment.

During running of the engine under its own power, the fluid actuated delivery valves 16, of the several cylinders are successively lifted off their seats 24, Fig. 5, to alternate open and closed positions by the discharge of air from the pistons 6, valves 16, acting as discharge valves for the displacement caused by these pistons which are now acting as scavenging pumps and scavenging air is forced through passages 15, valves 16, into compressed air chamber 12, which is common to two adjacent cylinders made so by reason of the manifold connection 12ª, the air rushing from the said chamber 12 into the several power cylinders 3, successively as the ports 10 are uncovered by the downward movement of their pistons 5. By reason of the manifold connection between the cylinders, when the power piston in one cylinder is on the downstroke, the scavenging piston in the adjacent cylinder will be compressing air into the chamber 12, which will be delivered through the manifold over into the power cylinder the piston in which is moving outward or is on the downstroke, immediately the piston uncovers the ports 10. Hence it will be seen that the air delivered by the one step piston is used to scavenge the next or adjacent power cylinder and vice versa.

Movement of the control lever to the first fuel-feed position gives only a relatively small charge of fuel oil, while further advanced positions of said lever give proportionately greater charges, it being understood that the position of the control lever determines the quantity of fuel oil fed to the atomizers until such time as the governor shall take control of the amount of fuel oil supplied the said lever having an operative connection with the variably operated fuel pumps.

As will be seen by referring to the drawings there are, in a two cylinder engine of the reversing type, two supplementary valves 35, and actuating cams 39, associated with each fluid actuated intercepting valve, and there are also two sets of atomizer actuating mechanisms associated with each atomizer valve 57. One train of mechanism is employed to run the engine "ahead," and the other train to run "astern," it being understood that when one train is in operation the other train is idle.

The operation of reversing the engine for running "astern" is accomplished by moving the control lever to the left or in a direction opposite to that when running "ahead," the various parts operating as before described.

The fuel oil enters the head of each power cylinder through an atomizer 56, as more clearly shown in Fig. 3, the delivery of the fuel oil being controlled by a valve 57 that is lifted upward from its seat by one or the other of two levers 58 pivoted at 59 to a bracket 60 mounted upon the head of the engine cylinder, as will be hereafter more fully described, the said valve being returned to its seat by the spring shown.

The fuel oil is fed to the power cylinders of the engine by a novel construction and arrangement of pumping apparatus, there being one pump for supplying fuel oil to each cylinder. In the present instance, I have shown a pair of pumps operated alternately by a common operating element, it being understood, of course, that the number of pumps employed is dependent upon the number of cylinders going to make up the engine.

In the instance shown, and as more clearly illustrated in Figs. 12 and 13, each pump comprises a vertically arranged cylinder 61 in which is reciprocally mounted a plunger 62, the latter being normally held in retracted position by means of a coiled spring 63 coiled about the lower end of a stem extension 64 of the plunger, said extension passing through a guide 65 between the end of which and a nut 66 carried by the stem-extension the said coiled spring is mounted, the nut 66 serving to adjust the tension of the spring. The pump cylinder 61 is provided at its upper end with an intake pipe 67 leading from the fuel oil supply tank 68, as more clearly shown in Figs. 1 and 8, and the oil is delivered to the engine cylinder or cylinders through the delivery pipe 69 leading from each pump cylinder 61, suitable check valves being employed to effect proper operation of the pumps, as more clearly shown in Fig. 12.

For convenience the intake pipe 67 is connected at its opposite ends respectively to two of the pump cylinders as shown, and the oil feed pipe leading from the oil tank 68 is connected to the pipe 67 by means of a T-coupling 70. The stem of each of the extensions 62 is provided with a yoke 71 as more clearly shown in Figs. 8, 12 and 13, through which yoke passes one arm 72 of a bell crank lever 73, the longer arm 74 of which bell crank lever is designed to be acted upon by a rotary cam 75 mounted upon a shaft 76 driven from a shaft 77, the latter being driven from the main shaft 9 of the engine, as more clearly shown in Fig. 1.

As before indicated I have, in the present instance, shown two pumps, and I have provided a separate and distinct actuator for operating the plunger of each pump, the said actuators being duplicates of one another, and so arranged that the cam 75 will alternately engage the same to alternately actuate the pump plungers 62. As will be seen by referring to Fig. 8, the two bell crank actuators 73 are arranged opposite each other, the arms 74 being located in parallelism and on opposite sides of the cam shaft 76 so as to be alternately engaged by the cam 75 carried by said shaft. It will be perfectly apparent that the amount of oil delivered to each of the engine cylinders will depend upon the length of stroke of the oil feed pump plungers 62, and I have provided novel means for varying the length of stroke of these plungers; and I have also provided a lost-motion connection between the pumping means and the manual control lever of the engine, whereby the oil feed pumps may be set in motion when the manual control lever is moved to a certain position, but which oil feed pumps will remain idle until the manual control lever has been moved to the proper position, the initial movement of the control lever having no effect on the operation of the oil feed pumps, this initial movement of the control lever serving merely to admit compressed air to the combined scavenging and compressed air starting motors as heretofore explained.

Each of the bell crank levers 73 is mounted to swing on a fulcrum pin 78 carried by a laterally shiftable slide plate 79, the said slide plates being free to slide in dovetailed guides 80. The movement of these slides with their fulcrum pins and bell crank levers is effected through the medium of two worm spindles 81 and 82, each spindle carrying a pair of right and left hand worms 83 and 84, respectively, each of which pair of worms is in mesh or gear with a worm sector 85. The sectors revolving on the pins which carry the bell crank levers 73, so that whatever movement is imparted to the sectors will likewise be imparted to the bell crank levers so as to move their lower ends 74 toward and from each other or toward and from the cam 75 on the shaft 76, the worm sectors being arranged to revolve on their fulcrum pins 78 and roll as pinions on a rack depending upon which of the worm spindles 81 or 82 is stationary, thereby causing the fulcrum pins 78 with their bell cranks 73 to move away from each other or closer together according to the direction of revolution of the worm spindle 81 or 82, and thereby increase or diminish the stroke of the fuel pump plungers 62, which are driven through an oscillating tumbler block connection 86 sliding on the shorter arms 72 of the bell crank levers and the yokes 71 of the pump plungers.

The worm spindle 81 may be rotated to effect movement of the bell crank lever 73, by means of a connection with the engine governor 87, see Figs. 1 and 4, this being accomplished by providing the spindle 81 with a pinion 88 that is in mesh with a rack 89 carried by a vertically moving rod 90 connected at its upper end to a lever 91 and pivoted at its rear end 92 to a suitable bracket, said lever 91 having a suitable connection with the governor 87 so as to move up or down depending upon the speed of the engine, and through the rack and pinion connection with the worm spindle 81, and its worms and worm sectors 83, 85, move the bell crank levers automatically toward and from each other to automatically control the delivery of fuel oil to the cylinders. I also provide an operative connection between the manual control lever of the engine, and the said bell crank levers 73, so as to move said levers closer together or farther apart depending upon the position of the manual control lever, so that the greater the movement given to this lever the nearer together the arms 74 of the bell crank levers will be brought and the greater the supply of oil pumped to the engine cylinders. This connection between the manual control lever and the bell crank levers consists of a crank arm 93 carried by the end of the shaft 42 upon which the control lever 41 is mounted, said crank arm 93 having a link connection 94 with a bell crank lever 95, to the longer arm of which is pivoted a rack 96 that meshes with a pinion 97 fixed to one end of the worm spindle 82. The lever 93, is on a dead center so that whichever way the control lever 41, is moved, that is to say, either "ahead" or "astern," the rack 96, will always move in the same direction. By reason of this construction it will be seen that whenever the manual control lever 41 is moved to bring its locking dog into engagement with the second notch in the dial plate 46 the worm spindle 82 through its rack and pinion connections 96 and 97, bell crank 95 and link and crank connections 94 and 93 with the shaft 42 of the control lever, will bring the arms 74 of the bell crank levers close together to be engaged and to be operated by the cam 75 on the shaft 76, the distance between the arms 74 of the bell crank levers 73 varying, depending upon the amount of movement given the control lever 41, it being understood, of course, that the dial 46 about which the control lever moves has several fuel feeding positions to any one of which the control lever may be moved and locked, and each position representing a different supply, as for instance "initial fuel feed," "half fuel feed," and "full fuel feed," these positions being duplicated on opposite sides of the dial so that the control lever may be set to proper position for running the engine "ahead" or "astern."

The crank 93 is provided with a bushing 98, see Figs. 9, 10 and 11, at the point where it is mounted upon the control lever shaft 42, said bushing having a substantially semi-circular cut out portion partially surrounding the said shaft and terminating at its ends in two shoulders or abutments 99 with either one or the other of which engages a key 100 carried by the shaft 42 so that during the initial movement of the control lever in either direction, that is to say to the right or to the left, no movement will be imparted to the crank arm 93, and its associated mechanism, leading to the fuel feed pumps. By this means I am able to move the control lever to the first notch position in order to initially start the engine by compressed air power, without feeding fuel oil to the engine cylinders or opening the atomizer. Immediately, however, the control lever is moved past the first notch position the key 100 will engage one or the other of the shoulders 99, depending upon the direction of movement of the control lever and the crank arm 93 will then begin to turn with the control lever shaft 42 to move the bell crank levers 73 in position for engagement with their actuating cam 75, it being understood that when in normal position, or in the idle position of the parts, the levers will be so widely separated that the cam 75, cannot engage the arm 74.

If it is desired to alter the position of the bell crank levers 73 without changing the position of the manual control lever, this may be effected by means of the hand wheel 101 mounted upon the end of the worm spindle 82, as more clearly shown in Fig. 8. In effecting this adjustment the rack 96 is first lifted out of engagement with the pinion 97, the hand wheel then being turned to effect proper adjustment of the bell crank levers 73 relative to the actuating cam 75 and the rack then again dropped into engagement with its pinion. This means for adjusting the position of the bell crank levers independently of the manual control lever will be found to be of advantage in case of leakages of oil in the pump packing or glands, or in the event of a heavier grade of oil being used, such as will require a greater stroke of the oil feed plungers.

In addition to the engine driven cam 75 for operating the oil feed pumps, I have provided a manually operable cam for operating the pumps through the arms 74 of the bell crank levers 73, this manually operable cam being employed to fill up the oil pipes leading from the fuel feed pumps to the atomizers before starting the engine, in case these pipes should have become emptied, or else through loss of pressure caused by leakage while the engine has been standing idle for any considerable time. This hand operated means referred to consists of a cam 102 mounted upon a shaft 103 located below the shaft 76, and which shaft 103 carries a crank arm 104 upon the lower end of which is mounted a handle 105, all as more clearly shown in Fig. 3. As will be apparent, rotation of the shaft 103 will cause its cam 102 to alternately engage the arms 74 of the bell crank lever 73 in order to actuate the pump plungers, and thus feed oil through the system of pipes to the atomizer 56.

As before indicated the charges of fuel oil are admitted to the working cylinders of the engine through an atomizer 56, the fuel oil being admitted under air pressure in the usual way upon the lifting of the valve 57, said valves being lifted at regular intervals through the medium of the levers 58, there being in the case of a reversible engine two such levers associated with the stem of each of the valves 57. One of the levers 58 of the two referred to is employed to lift its valve when the control lever is set for running the engine "ahead" and the other of said levers is employed when the control lever is set for running the engine "astern." The operating mechanism for these levers which will now be described, is so arranged that one or the other will be automatically set in position for operation by the movement of the manual control lever.

Pivotally connected to the free end of each of the atomizer valve levers 58 is a depending rod 106 carrying a roller 107 at its lower end, such roller being adapted to move back and forth over the face of a lever 108 fulcrumed at 109, said lever carrying a roller 110 at its free end that coöperates with a cam 111 mounted on the cam shaft 40, the said cam 111 acting to lift the lever 108 at regular intervals, and through the described connections with the lever 58 lift the valve 57 of the atomizer to admit a charge of fuel oil into the engine cylinders. The roller 110 that is carried by the lever 108 is yieldingly held in contact with its cam 111 by means of a coiled spring 112 Fig. 3 that bears against a toe 113 formed integral with the lever 108. In the normal or inoperative position of the parts the roller 107 of the rod 106 is situated directly above the fulcrum pin 109 of the lever 108, in which position there will be no vertical movement of the rod 106, and its associated parts, even though the lever 108 should be actuated by its cam 111. If, however, the rod 106 with its roller 107 is moved outward over the face of the lever 108, toward the end thereof, it will be apparent that the movement of the lever 108 imparted thereto by the cam 111 will be imparted to the rod 106, and the valve 57 of the atomizer lifted to a degree depending upon the distance the roller 107 is moved outward over the face of the lever 108.

The roller 107 is normally held in yielding contact with the face of the lever 108 by means of a coiled spring 114, one end of which is connected to the lever 58 at 115 and its other end being provided with a threaded stem 116, which passes through an opening in a bracket 117, the stem being provided with a thumb nut 118, by which the tension of the spring may be adjusted at will.

As before indicated there are in a reversible engine two levers 58 associated with each of the atomizer valves 57, and there are also two sets of the mechanisms last described, as more clearly shown in Fig. 4, these mechanisms being arranged side by side and being independently operable, one set being provided for operation in running the engine "ahead" and the other set for operation in running the engine "astern".

When one of the rods 106 is set for operation in coöperative relation with the actuating lever 108, the other of the rods 106 will remain in inoperative or idle position.

The cam shaft 40 is driven from the main shaft 9 of the engine through the vertical shaft 77 heretofore referred to, suitable connecting gearing 119 and 120 being employed between the opposite ends respectively of the shaft 77, and the engine shaft 9, and cam shaft 40, all as more clearly shown in Fig. 1.

In order to set one or the other of the roller ends of the connecting rods 106 in coöperative relation with its actuating lever 108 by means of the manual control lever, I provide the following connections all as more clearly shown in Figs. 1, 14 and 15. Journaled in a suitable bracket situated at a point between the opposite ends of the connecting rods 106, is a shaft 121 having two crank arms 122 and 123, respectively, the arm 122 being slidably connected at 124 to the rod 106, and the crank arm 123 being pivotally connected to a link 125, which link is pivoted at 126 to a vertically reciprocating slide 127 more clearly shown in Figs. 1 and 4, said slide being normally urged upward by means of the coiled spring 128, one end of which is attached to the engine frame, and the other end of which is provided with a threaded stem 129 which passes through an opening in a lug 130 carried by the slide 127, the said stem being provided with a thumb nut 131, by which the tension of the spring may be adjusted.

As more clearly shown in Fig. 14 there are in an engine of the reversible type two sets of the mechanisms just described, these being arranged on opposite sides of the two levers 108 and one set coöperating with each of the connecting rods 106. Between the lower ends of the two slides 127 is located a T-shaped lever 132 pivoted at 133, said lever having at its upper end a pair of oppositely extending arms 134, each of which normally rests upon a pin or roller 135 carried by each of the slides 127 so that if the T-shaped lever 132 is moved in one direction, as for instance to the right, the arm 134 will act on the pin or roller 135 on one of the slides 127, and move the same downward, which in turn will, through its connections with the crank lever 121, move one of the connecting rods 106 outward in position to be actuated by its operating cam 111 to lift the valve 57 of the atomizer and thus admit a charge of fuel oil into the engine cylinder, the before mentioned spring 128 returning the slides 127 to normal position on bringing the control lever to "stop" position on the dial. If on the other hand the T-shaped lever 132 is moved in the opposite direction, as for instance to the left, the slide 127 on the right side of the T-shaped lever will be moved downward to operate the other of the connecting rods 106 to set the same in position for operation. The lower end of the T-shaped lever 132 is pivotally connected to a slide bar 136, said slide bar being connected at one end to a crank arm 137 carried by the shaft 42 of the control lever, the said arm 137 having the same lost motion connection with the shaft 42 as that of the crank 93, as previously described, so that the atomizers are not opened when starting the engine under compressed air.

It should be understood that there are as many T-shaped levers 132 as there are engine cylinders, and that the slide bar 136 is connected to each of the said levers, so that a movement of the manual control lever in one direction or the other will effect a corresponding movement of all the T-shaped levers 132, and it will also be understood that if the manual control lever is moved in one direction, as for instance to the right to set the engine for running "ahead", the proper connecting rods 106 will also be set for this operation, and if the manual control lever be moved in the opposite direction, as for instance to the left, the corresponding parts will be set for running the engine "astern".

From the foregoing description taken in connection with the accompanying drawings, it will be seen that I have provided a simple arrangement whereby the fuel feed pumps and the atomizer valve are coöperatively connected to a single manual control lever, the various parts being so organized and arranged that they may be set by the manual control lever for running the engine either "ahead" or "astern", the said manual control lever being also arranged to control the initial starting of the engine under compressed air power, during which initial operation no fuel oil will be delivered to the engine cylinders.

While I have herein shown and described a preferred embodiment of my invention, I do not wish to be understood as limiting myself to the precise details shown and described, except as I may be limited by the appended claims. I also wish it understood that certain features of the invention herein shown and described may be employed in other combinations than those herein shown.

I do not claim in the present application the fuel oil pumping mechanism *per se*, except as the same or an equivalent mechanism may be employed in coöperative association with other parts, the said pumping mechanism *per se* being claimed in my separate co-pending application, Serial Number 768,484, filed May 19, 1913; nor do I claim *per se* in the present application, except in combination with other correlated parts, the atomizer valve controlling and actuating mechanism, this mechanism being also claimed in my copending application, Serial No. 769,926, filed May 25, 1913.

What I claim is:—

1. In an internal combustion engine of the Diesel type employing a power cylinder and piston and a scavenging cylinder and piston, a normally closed valve-controlled passage for establishing communication between the said two cylinders, fluid-actuated valve means for opening and closing said passage, a compressed air source leading to the said valve means, and manually operable means for admitting compressed air from said source through said valve means direct to the scavenging cylinder above its piston whereby the latter may be utilized as an air motor to initially start the engine, said fluid-actuated valve means closing off communication between the passage and power cylinder of the engine when compressed air from said source is being admitted to the scavenging cylinder.

2. In an internal combustion engine, a cylinder having bores of different diameter, constituting respectively power and scavenging cylinders, said bores having communication one with the other by an outside passage leading from the upper portion of one bore to the lower portion of the other bore, a stepped piston operating in said bores, fluid actuated valve means in the said passage normally closing the communication between the two bores, a compressed air source leading to the said passage and valve means, and manually operable means for admitting compressed air from said source to said valve means whereby to establish direct communication between the compressed air source and the cylinder bore of larger diameter, to start the engine under air power, said valve means closing off communication between the passage and power cylinder when compressed air from said source is being admitted to the passage of the scavenging cylinder.

3. In an internal combustion engine, a stepped cylinder and a stepped piston operating therein, said cylinders and pistons constituting power and scavenging members, a chamber for compressed air associated with the cylinder, said chamber having communication respectively with the portions of the cylinder of different diameter, fluid-actuated valve means for controlling the entrance of air to said chamber and to that portion of the cylinder of larger diameter, a compressed air supply, and manually operable means for establishing communication between the said compressed air supply and said valve means and from the latter to the cylinder of larger diameter above its piston, whereby the latter may be utilized as a compressed-air motor to initially start the engine, said valve means closing off communication between the passage and power cylinder when compressed air from said source is being admitted to the scavenging cylinder.

4. In an internal combustion engine of the Diesel type embodying power cylinders and pistons and scavenging cylinders and pistons, a passage for establishing communication between adjacent power and scavenging cylinders, and fluid-actuated valve-means associated with said passage for controlling the admission of starting air to a scavenging cylinder and of scavenging air to a power cylinder, said valve-means being operated alternately first by starting air leading to a scavenging cylinder and then by scavenging air coming from said cylinder.

5. In an internal combustion engine of the Diesel type embodying a plurality of cylinders each having a power piston and a scavenging piston, a compressed air source of supply, separate valve-controlled passages for establishing communication between each of the scavenging and power cylinders, said passage each having communication with said compressed air source, a fluid-actuated valve in each of said passages, and manually controlled means for admitting air from said source to the said valve controlled passages successively and from thence to the scavenging cylinders above the pistons therein to initially start the engine under compressed air power, the said fluid-actuated valves closing off communication between the passages and their power cylinders when compressed air from said source is being admitted to the scavenging cylinders.

6. In a reversible internal combustion engine of the Diesel type, employing a power cylinder and piston and a scavenging cylinder and piston, a valve-controlled passage for establishing communication between the said cylinders, a fluid-actuated valve normally closing said passage, a compressed air source of supply, separate valve-controlled conduits leading from said source to said passage below said valve, either one of which conduits is adapted to supply compressed air from the source to the passage to operate the fluid-actuated valve and position the latter to admit compressed air from the passage into the scavenging cylinder but close the passage to the power cylinder, and manually operable means for admitting compressed air from said source to either of said conduits independently of the other, whereby the engine may be initially started in either direction under compressed air power acting directly upon the piston in the scavenging cylinder.

7. In an internal combustion engine of the Diesel type employing a power cylinder and piston and a scavenging cylinder and piston, a valve-controlled passage for establishing communication between said cylinders, a valve normally closing said passage, a compressed air source, separate conduits leading from said source to said valve, a valve in each conduit, said valve opening under air pressure from said source, and manually operable means for admitting compressed air from said source to one or the other of said conduits depending upon the position of said manually operable means.

8. In an internal combustion engine of the Diesel type employing a power cylinder and piston and a scavenging cylinder and piston, a valve-controlled passage for establishing communication between said cylinders, a fluid actuated valve normally closing said passage, a compressed air source, separate conduits leading from said source to said valve, a fluid actuated valve in each conduit, and manually operable means for admitting compressed air from said source through one or the other of said conduits to the scavenging cylinder above its piston, whereby the latter may be utilized as an air motor for initially starting the engine.

9. In an internal combustion engine of the Diesel type embodying a power cylinder and piston and a scavenging cylinder and piston, a cam shaft with cams thereon, a valve-controlled passage for establishing communication between said cylinders, a valve normally closing said passage, a compressed air source, separate conduits leading from said source to said valve, a valve in each conduit, said valves having stems cooperatively associated with the cams on the cam shaft, and manually operable means for admitting compressed air from said source to either of said conduits.

10. In an internal combustion engine, a cylinder having bores of different diameter, said bores having communication one with the other by an outside passage leading from the upper portion of one bore to the lower portion of the other bore, a stepped piston operating in said bores, valve means in said passage normally closing the communication between the two bores, said valve means comprising a fluid actuated main valve, and two supplemental valves associated with said main valve, a compressed air source, separate conduits leading from said source to said supplemental valves, and manually operable means for admitting compressed air to one or the other of said conduits to establish direct communication between the compressed air source and the cylinder bore of larger diameter.

11. In an internal combustion engine, a cylinder having bores of different diameter, said bores having communication one with the other by an outside passage leading from the upper portion of one bore to the lower portion of the other bore, a stepped piston operating in said bores, valve means in this passage normally closing communication between the two bores, said valve means comprising a main valve and two supplemental valves associated with said main valve, cams for controlling the opening and closing of said supplemental valves, a compressed air source, separate conduits leading from said source to said supplemental valves, and manually operable means for admitting compressed air from said source to one or the other of said conduits whereby to establish direct communication between the compressed air source and the cylinder bore of larger diameter.

12. In an internal combustion engine, a stepped cylinder, and a stepped piston operating therein, a chamber for compressed air associated with said cylinder, said chamber having communication respectively with the portions of the cylinder of different diameter, a normally closed valve for controlling the entrance of air to said chamber and to that portion of the cylinder of larger diameter, a piston associated with said valve, a compressed air supply, separate valve controlled conduits leading to said valve below the piston thereof, and manually operable means for establishing communication between said compressed air supply and the cylinder of larger diameter above its piston through one or the other of said conduits, whereby the said cylinder and piston of larger diameter may be utilized as a compressed air motor to initially start the engine.

13. An internal combustion engine of the compression type embodying a power cylinder and piston and a scavenging cylinder and piston, a valve-controlled discharge passage leading from the scavenging cylinder and having an outlet through which scavenging air for a power cylinder may pass, a source of compressed air leading to the scavenging cylinder above its piston for driving the latter outward to initially start the engine by compressed air from said source, means for exhausting the starting air from the scavenging cylinder on the outstroke of its piston, and an intercepting valve associated with the said discharge passage leading from the scavenging cylinder, said valve operating upon the admission of starting air to the scavenging cylinder to close the outlet from the discharge passage and said valve also operating upon exhaustion of starting air from the scavenging cylinder to return to normal position whereby scavenging air may pass through the outlet from the passage on the instroke of the scavenging piston.

14. In an internal combustion engine embodying a power cylinder and piston and a scavenging cylinder and piston, a valve-controlled passage leading from the scavenging cylinder through which passage starting air may pass into said cylinder to drive its piston outward and out of which passage scavenging air may pass, and fluid actuated valve means associated with said passage, said valve means operating under the action of starting air admitted to the passage to close off the normal discharge therefrom and maintain the discharge closed during the outstroke of the piston and until the starting air is exhausted from the scavenging cylinder whereupon the valve means will automatically assume its normal position to permit scavenging air from the scavenging cylinder to be forced through said passage on the instroke of the piston.

15. In an internal combustion engine embodying power cylinders and pistons and scavenging cylinders and pistons, a source of compressed air leading to each of the said scavenging cylinders, fluid-actuated valve means associated with each scavenging cylinder for controlling the admission of compressed air thereto to drive the engine ahead or astern, and a movable controller for governing the admission of compressed air to said valve means, the position of said controller determining the direction of rotation of the engine shaft.

16. In an internal combustion engine, embodying power cylinders and pistons and scavenging cylinders and pistons, a source of compressed air leading to each of the said scavenging cylinders, fluid-actuated valve means associated with each of the scavenging cylinders for controlling the admission of compressed air thereto to drive the engine ahead or astern, and a controlling lever for governing the admission of compressed air to said valve means, said controlling lever having movement in two directions and the direction of movement of which determines the direction of rotation of the engine shaft.

17. In an internal combustion engine embodying power cylinders and pistons and scavenging cylinders and pistons, a source of compressed air leading to each of said scavenging cylinders, means for feeding fuel oil to the power cylinders, fluid-actuated valve means associated with each scavenging cylinder for controlling the admission of compressed air thereto to drive the engine either ahead or astern, a movable controller for governing the admission of compressed air to said valve means, the position of said controller determining the direction of rotation of the engine shaft, and a connection between the controller and the fuel feeding means for governing the operation of the latter.

18. In an internal combustion engine embodying power cylinders and pistons and scavenging cylinders and pistons, a source of compressed air leading to each of said scavenging cylinders, valve means associated with each scavenging cylinder for controlling the admission of compressed air thereto to drive the engine either ahead or astern, pumps for feeding fuel oil to the power cylinders, a movable controller for governing the admission of compressed air through said valve means, the position of said controller determining the direction of rotation of the engine shaft, and a lost motion connection between the controller and the fuel feeding pumps for governing the operation of the latter.

19. In an internal combustion engine of the Diesel type embodying power cylinders and pistons and scavenging cylinders and pistons, a source of compressed air leading to each of the scavenging cylinders, means for feeding fuel oil to the power cylinders, fluid-actuated valve means associated with each scavenging cylinder for controlling the admission of compressed air thereto to initially start the engine under compressed air power, a movable controller for governing the admission of compressed air through said valve means to the scavenging cylinders, and for governing the charge of fuel oil to the power cylinders, and means actuated by said controller for controlling the operation of the fuel feeding means.

20. In an internal combustion engine of the Diesel type embodying power cylinders and pistons and scavenging cylinders and pistons, a source of compressed air leading to each of the scavenging cylinders, means for feeding fuel oil to the power cylinders, fluid-actuated valve means associated with each scavenging cylinder for controlling the admission of compressed air thereto to initially start the engine under compressed air power, a movable controller for governing the admission of compressed air through said valve means to the scavenging cylinders, and for governing the charge of fuel oil to the power cylinders, and means actuated by said controller for controlling the operation of the fuel feeding means, said actuated means being thrown into operation by the controller after the latter has moved past the compressed air admission position.

21. In an internal combustion engine of the Diesel type embodying power cylinders and pistons, and scavenging cylinders and pistons, a source of compressed air leading to each of said scavenging cylinders, means for feeding fuel oil to the power cylinders, valve means associated with each scavenging cylinder for controlling the admission of compressed air thereto to drive the engine either ahead or astern, a movable controller for governing the admission of compressed air through said valve means to the scavenging cylinders and for governing the charge of fuel oil to the power cylinders, and means actuated by said controller after the latter has moved past the compressed air admission position for setting the fuel feeding means for operation.

22. In an internal combustion engine embodying power cylinders and pistons and scavenging cylinders and pistons, a source of compressed air leading to each of said scavenging cylinders, plunger pumps for feeding fuel oil to the power cylinders, valve means associated with each scavenging cylinder for controlling the admission of compressed air thereto to initially start the engine, a movable controller for governing the admission of compressed air through said valve means to the scavenging cylinders, and means actuated by the controller for determining the length of stroke of the fuel feeding plungers.

23. In an internal combustion engine of the Diesel type embodying power cylinders and pistons and scavenging cylinders and pistons, a source of compressed air leading to each of said scavenging cylinders, means for feeding fuel oil to the power cylinders, including variable means for varying the charge of fuel oil fed to said power cylinders, valve means associated with each scavenging cylinder for controlling the admission of compressed air thereto to initially start the engine, a movable controller for governing the admission of compressed air to said valve means, and a connection between said controller and the said variable means for actuating the latter.

24. In an internal combustion engine of the Diesel type embodying power cylinders and pistons and scavenging cylinders and pistons, a source of compressed air leading to each of said scavenging cylinders, means for feeding fuel oil to the power cylinders, including variable means for varying the charge of fuel oil fed to said power cylinders, valve means associated with each scavenging cylinder for controlling the admission of compressed air thereto to initially start the engine, a movable controller for governing the admission of compressed air to said valve means, and a lost motion connection between said controller and the said variable means for actuating the latter.

25. In an internal combustion engine of the Diesel type embodying power cylinders and pistons and scavenging cylinders and pistons, a source of compressed air leading to each of said scavenging cylinders, a valved atomizer for each power cylinder, means for feeding fuel oil to the said atomizers, a pair of cam operated valve actuators for each atomizer, and a movable controller common to both said fuel feeding means and said valve actuators.

26. In an internal combustion engine of the Diesel type embodying power cylinders and pistons and scavenging cylinders and pistons, a source of compressed air leading to each of said scavenging pistons, a valve controlled atomizer for each power cylinder, a pair of valve actuators for each atomizer, means for feeding fuel oil to the said atomizers, including variable means for varying the charge of fuel oil so fed, valve means associated with each scavenging cylinder for controlling the admission of compressed air thereto to initially start the engine, a movable controller for governing the admission of compressed air to said valve means, a connection between said controller and the said variable means for actuating the latter, and a separate connection between the said controller and the said atomizer valve actuators.

27. In an internal combustion engine of the Diesel type embodying power cylinders and pistons and scavenging cylinders and pistons, an atomizer for each power cylinder, a pair of cam actuated valve actuators for each atomizer, separate cams for actuating said valve actuators, means for feeding fuel oil to the atomizers including variable means for varying the charge of fuel oil so fed, a source of compressed air leading to each of the scavenging cylinders, valve means associated with each scavenging cylinder for controlling admission of compressed air thereto to initially start the engine, a movable controller for governing the admission of compressed air to said valve means, and separate connections between said controller and said variable oil feeding means and the valve actuators respectively.

28. In an internal combustion engine of the Diesel type employing power cylinders and pistons and scavenging cylinders and pistons, a valve controlled passage for establishing communication between each of the said power and scavenging cylinders, a fluid actuated valve normally closing each passage, a pair of fluid actuated valves associated with each of the aforesaid valves for controlling the operation of the latter to drive the engine either ahead or astern, a source of compressed air, a separate valve controlled conduit leading from said source to each of the said pairs of valves, a manually operable controller, and means operated thereby for controlling the admission of compressed air into one or the other of said conduits respectively.

29. In an internal combustion engine of the Diesel type embodying power cylinders and pistons and scavenging cylinders and pistons, a valve controlled passage for establishing communication between each of the said power and scavenging cylinders, a fluid actuated valve normally closing each passage, a pair of fluid actuated valves associated with each of the aforesaid valves for controlling the operation of the latter to drive the engine either ahead or astern, a source of compressed air, a valve box to which said source leads, separate conduits leading from said valve box to the said pairs of valves respectively, separate cut off valves in said valve box for controlling the passage of compressed air to said conduits, and a manually operable controller for actuating said cut off valves.

30. In an internal combustion engine of the Diesel type embodying power cylinders and pistons and scavenging cylinders and pistons, a valve controlled passage for establishing communication between each of the said power and scavenging cylinders, a fluid actuated valve normally closing each passage, a pair of fluid actuated valves associated with each of the aforesaid valves for controlling the operation of the latter to drive the engine either ahead of astern, a source of compressed air, a valve box to which said source leads, separate conduits leading from said valve box to the said pairs of valves respectively, separate cut off valves in said valve box for controlling the passage of compressed air to said conduits, and a manually operable controller for actuating said cut off valves, said controller being movable in two directions, and the direction of movement determining the particular valve to be actuated.

31. An internal combustion engine having a power cylinder and piston and a separate scavenging cylinder and piston arranged in tandem with said power cylinder, a valve-controlled passage leading from the said scavenging cylinder to the power cylinder, a fluid-actuated valve in said passage, and a compressed air source of supply leading to said passage and from thence to the scavenging cylinder, whereby its piston may be driven under air pressure from said source of supply to initially start the engine, said fluid-actuated valve operating to close communication between the passage and power cylinder when starting air is being admitted to the scavenging cylinder.

32. An internal combustion engine of the compression type, embodying a power cylinder and piston and a scavenging cylinder and piston arranged in tandem, said power cylinder having inlet and exhaust ports in a side wall thereof adapted to be covered and uncovered by its piston during the working of the latter, a valve-controlled passage for establishing communication between the power and scavenging cylinders through said inlet ports in the power cylinder, a fluid-actuated valve normally closing said passage but capable of opening movements to furnish a supply of scavenging air for a power cylinder during each compression stroke of the scavenging piston, a compressed air source of supply leading to said valve-controlled passage, and manually operable means for admitting compressed air from said source to said passage and to the scavenging cylinder above its piston whereby the latter may be utilized as an air motor to initially start the engine.

33. An internal combustion engine of the Diesel type embodying a power cylinder and piston and a scavenging cylinder and piston arranged in tandem, said power cylinder having inlet and exhaust ports in a side wall thereof adapted to be covered and uncovered by its piston during the working of the latter, a valve controlled passage for establishing communication between the power and scavenging cylinders through said inlet ports in the power cylinder, a fluid-actuated valve normally closing said passage but capable of opening movements to furnish a supply of scavenging air for a power cylinder during each compression stroke of the scavenging piston, a compressed air source of supply leading to said passage beneath the fluid-actuated valve for lifting the latter to close the communication between the said passage and the power cylinder and open said passage to the scavenging cylinder, and manually operable means for admitting compressed air from said source into said valve-controlled passage and to the scavenging cylinder above its piston whereby the latter may be utilized as an air motor to initially start the engine.

34. An internal combustion engine of the Diesel type embodying a power cylinder and piston and a scavenging cylinder and piston, a valve-controlled passage for establishing communication between the said two cylinders, and a fluid-actuated valve in said passage, said valve having two seating positions, one of which normally closes the passage but permits the valve to lift under impulse of scavenging air from the scavenging cylinder during normal operation of the engine, and the other of which cuts off communication with the power cylinder but permits starting air from a suitable source to pass into the scavenging cylinder and act upon its piston for starting the engine under air pressure.

35. An internal combustion engine of the Diesel type embodying a power cylinder and piston and a scavenging cylinder and piston of larger diameter than, and arranged in tandem with, the power cylinder, a valve-controlled passage between the said cylinders, and a fluid-actuated valve in said passage, said valve having two seating positions, one of which normally closes the passage to both cylinders but permits the valve to open under impulse of scavenging air from the scavenging cylinder during normal operation of the engine, and the other of which cuts off communication with the power cylinder but permits starting air from a suitable source to pass into the scavenging cylinder and act upon its piston for starting the engine under compressed air power.

36. An internal combustion engine of the

Diesel type embodying a power cylinder and piston and a scavenging cylinder and piston of larger diameter than, and arranged in tandem with, the power cylinder, a valve-controlled passage leading from the upper end of the scavenging cylinder through a side wall of the power cylinder intermediate the ends thereof, said passage having an inlet, and a fluid-actuated valve in said passage, said valve having two seating positions, one of which normally closes the passage to both cylinders but permits the valve to open under the impulses of scavenging air from the scavenging cylinder during normal operation of the engine, and the other of which cuts off communication with the power cylinder but permits starting air entering the said inlet to said passage to pass into the scavenging cylinder above its piston for starting the engine initially under compressed air power.

37. An internal combustion engine of the Diesel type embodying a power cylinder and piston and a scavenging cylinder and piston of larger diameter than, and arranged in tandem with the power cylinder, a valve-controlled passage leading from the upper end of the scavenging cylinder through a side wall of the power cylinder, said passage having an inlet, a fluid-actuated valve in said passage, said valve having two seating positions, one of which normally closes the passage to both cylinders but permits the valve to open under impulses of scavenging air from the scavenging cylinder during normal operation of the engine, and the other of which cuts off communication with the power cylinder but permits starting air entering the said inlet to said passage to pass into the scavenging cylinder above its piston for starting the engine initially under compressed air power, a source of compressed air leading to said inlet, and a manually operable valve for controlling the admission of compressed air to said inlet.

38. An internal combustion engine of the Diesel type embodying a power cylinder and piston and a scavenging cylinder and piston of larger diameter than and arranged in tandem with the power cylinder, a valve-controlled passage leading from the scavenging cylinder to the power cylinder, said passage having an inlet conduit communicating therewith, a cam-actuated valve in said inlet, a fluid-actuated intercepting valve in said passage, said intercepting valve having two seating positions, one of which normally closes the passage to the cylinders but is free to open under impulses of scavenging air from the scavenging cylinder during normal running of the engine under fuel power, and the other of which cuts off communication with the power cylinder but permits starting air flowing through the said conduit and inlet to pass through the said passage into the scavenging cylinder above its piston for starting the engine initially under compressed air power, a source of compressed air leading to said conduit, and a manually operable valve for controlling the admission of compressed air to said conduit.

39. An internal combustion engine of the Diesel type embodying a power cylinder and piston and a scavenging cylinder and piston, a valve-controlled passage for establishing communication between the said two cylinders, a fluid-actuated intercepting valve in said passage, a source of compressed air supply, a conduit leading from said source and communicating with said passage, a valve normally closing off communication with the passage, said valve having two closing positions one of which occurs when air from said source acts thereon, and means for mechanically actuating said valve from a driven part of the engine when held in said last named position, whereby said air may pass from the conduit into the passage and act upon the intercepting valve to lift the same and admit the air into the scavenging cylinder to start the engine under compressed air power.

40. An internal combustion engine of the Diesel type embodying a power cylinder and piston and a scavenging cylinder and piston arranged in tandem, a valve-controlled passage for establishing communication between the said two cylinders, a fluid-actuated intercepting valve in said passage, a source of compressed air supply, a conduit leading from said source to said passage, a valve closing said conduit, means actuated from a driven part of the engine for mechanically opening said valve to admit air from said source to act upon the intercepting valve, open the latter and permit the air to pass through the passage into the scavenging cylinder for starting the engine under compressed air power, and a manually operable valve for admitting air from said source to said conduit.

41. An internal combustion engine of the Diesel type embodying a power cylinder and piston and a scavenging cylinder and piston arranged in tandem, a valve-controlled passage for establishing communication between the said two cylinders, a fluid-actuated valve in said passage, said valve having two seating positions, one of which normally closes the passage but permits the valve to open under impulses of scavenging air from the scavenging cylinder during normal running of the engine under fuel power, and the other of which cuts off communication with the power cylinder but permits starting air to pass into the scavenging cylinder and act upon its piston for starting the engine under compressed air power, a source of compressed air, a conduit leading from said source to said passage, a valve closing said conduit, a cam actuated from a driven part of the engine for mechanically opening said valve to admit air from said source to said passage and through the latter to the scavenging cylinder for air starting, and a manually operable valve for admitting air from said source to said conduit.

42. In an internal combustion engine of the Diesel type embodying a power cylinder and piston and a scavenging cylinder and piston, a cam shaft with a cam thereon, a valve controlled passage for establishing communication between said cylinders, a fluid actuated valve normally closing said passage, a compressed air source, a conduit leading from said source to said valve controlled passage, a valve in said conduit, said last named valve having a stem, one end of which is adapted to be engaged by the cam on the cam shaft to move the valve from its seat, and manually operable means for admitting compressed air from said source to said conduit to hold the stem of said last named valve in elevated position to be engaged by its cam.

43. In an internal combustion engine of the compression type embodying power cylinders and pistons and scavenging cylinders and pistons, valve controlled passages for establishing communication between adjacent power and scavenging cylinders, a fluid-actuated valve associated with each passage, said valves operating successively under air pressure to alternately open and close the normal discharge from the passages, closing movement occurring when starting air is being admitted to the scavenging cylinders successively to force their pistons outward, and opening movement occurring during the instroke of the pistons whereby scavenging air is supplied to the power cylinders.

44. In an internal combustion engine, a cylinder having bores of different diameter, said bores having communication one with the other by an outside passage leading from the upper portion of one bore to the lower portion of the other, a step piston operating in said bores, fluid-actuated valve means in said passage normally closing the communication between the two bores in the cylinders, said valve means comprising a fluid actuated intercepting valve and a supplemental valve associated with said intercepting valve, a compressed air source, a conduit leading from said source to said supplemental valve, and manually operable means for admitting compressed air into said conduit to establish direct communication between the compressed air source and the cylinder bore of larger diameter for starting the engine under compressed air power.

45. In an internal combustion engine, a step cylinder, and a step piston operating therein, a chamber for compressed air associated with said cylinder, said chamber having communication respectively with the portions of the cylinder of different diameter, a normally closed fluid-actuated valve for controlling the entrance of air to said chamber, and to that portion of the cylinder of larger diameter, a piston associated with said valve, a compressed air source of supply, a valve controlled conduit leading from said source to said valve below the piston thereof, and manually operable means for establishing communication between said compressed air source and the cylinder of larger diameter above its piston through said conduit, whereby said cylinder and piston of larger diameter may be utilized as a compressed air motor to initially start the engine.

46. In an internal combustion engine embodying power cylinders and pistons and scavenging cylinders and pistons, a source of compressed air leading to each of said scavenging cylinders, fluid-actuated valve means associated with each scavenging cylinder for controlling the admission of compressed air thereto to drive the engine, pumps for feeding fuel oil to the power cylinders, a movable controller for governing the admission of compressed air through said valve means, and a lost motion connection between the controller and the fuel feeding pumps for governing the operation of the latter.

47. In an internal combustion engine of the Diesel type embodying power cylinders and pistons and scavenging cylinders and pistons, a source of compressed air leading to each of said scavenging pistons, a valve controlled atomizer for each power cylinder, a valve actuator for each atomizer, means for feeding fuel oil to said atomizers, including variable means for varying the charge of fuel oil so fed, valve means associated with each scavenging cylinder for controlling the admission of compressed air thereto to initially start the engine, a movable controller for governing the admission of compressed air to said valve means, an operative connection between said controller and the said variable means for actuating the latter, and a separate connection between the said controller and the said valve actuator.

48. In an internal combustion engine of the Diesel type embodying power cylinders and pistons and scavenging cylinders and pistons, an atomizer for each power cylinder, a cam actuated valve actuator for each atomizer, a separate cam for actuating each valve actuator, means for feeding fuel oil to the atomizers including adjustable means for varying the charge of fuel oil so fed, a source of compressed air leading to each of the scavenging cylinders, fluid actuated valve means associated with each scavenging cylinder for controlling the admission of compressed air thereto to initially start the engine, a movable controller for governing the admission of compressed air to said valve means, and separate connections between said controller and said adjustable oil feeding means and the valve actuators respectively.

49. In an internal combustion engine having a power cylinder and piston and a scavenging cylinder and piston, a valve controlled passage leading from said scavenging cylinder to said power cylinder, fluid-actuated valve means in said passage, and a compressed air source of supply leading to said scavenging cylinder whereby its piston may be driven under air pressure from said source to initially start the engine under compressed air power, said fluid actuated valve means operating automatically to close off communication between the scavenging and power cylinders when starting air from said source is being admitted to the scavenging cylinder.

50. In an internal combustion engine having a power cylinder and piston and a scavenging cylinder and piston, a valve controlled passage leading from said scavenging cylinder to said power cylinder, fluid actuated valve means normally closing said passage, and a compressed air source of supply leading to said scavenging cylinder whereby its piston may be driven under air pressure from said source to initially start the engine under compressed air power, said fluid actuated valve means operating automatically under influence of starting air from said source to close off communication between the scavenging and power cylinders when starting air is being admitted to the scavenging cylinder, and said valve being also operative under impulses of the scavenging piston to admit scavenging air to the power cylinder.

51. In an internal combustion engine having a power cylinder and piston and a scavenging cylinder and piston, said cylinders and pistons being arranged in tandem, a valve controlled passage leading from said scavenging cylinder to said power cylinder, fluid actuated valve means in said passage, and a compressed air source of supply leading to said scavenging cylinder above its piston whereby the latter may be driven under air pressure from said source to initially start the engine under compressed air power, said fluid actuated valve means operating to close the passage leading from the scavenging cylinder during the outstroke of the piston when the latter is driven under the influence of starting air from said source, and said valve means operating to open the said passage to admit scavenging air to the power cylinder upon the upstroke of the piston.

52. In an internal combustion engine embodying a power cylinder and piston and a scavenging cylinder and piston, a valve controlled passage leading to the scavenging cylinder through which passage starting air may enter said cylinder and out of which scavenging air may pass, an inlet and a discharge communicating with one end of said passage, and an intercepting valve associated with said inlet and discharge, said valve operating to cut off the said discharge when starting air is admitted for the purpose of driving the scavenging piston outward, and said valve also operating upon the return stroke of the said piston to permit the normal supply of scavenging air to be discharged from the cylinder for scavenging purposes.

53. In an internal combustion engine of the compression type embodying power cylinders and pistons and scavenging cylinders and pistons, and fluid actuated valve means for controlling the admission of starting air to the scavenging cylinders and of scavenging air from the latter named cylinders to the power cylinders, said valve means including a main valve and a mechanically actuable supplemental valve for controlling the admission of starting air to the main valve, said valve means operating alternately first by starting air leading to the scavenging cylinders to admit starting air therein, and then by scavenging air coming from said cylinders to direct such air to the power cylinders.

54. In an internal combustion engine of the compression type embodying a power cylinder and piston and a scavenging cylinder and piston, a valve-controlled passage for establishing communication between said cylinders, fluid-actuated valve means in said passage, and a compressed air source of starting air having a conduit connection with said passage, said valve means being actuated by the air pressure from said source to admit starting air to the scavenging cylinder to force its piston outward and also actuated by the air pressure from the scavenging cylinder during the instroke of its piston to supply scavenging air to the power cylinder.

55. In an internal combustion engine of the compression type embodying a power cylinder and piston and a scavenging cylinder and piston, a valve controlled passage for establishing communication between said cylinders, fluid-actuated valve means in said passage, a compressed air source of starting air having a conduit connection with said passage, said valve means being actuated by the air pressure from said source to admit starting air to the scavenging cylinder to force its piston outward and also actuated by the air pressure from the scavenging cylinder during the instroke of its piston to supply scavenging air to the power cylinder, and means controlled from a moving part of the engine for cutting off the supply of starting air when the valve means is admitting scavenging air to the power cylinder.

56. In a reversible internal combustion engine of the compression type embodying power cylinders and pistons and scavenging cylinders and pistons, an atomizer valve associated with each power cylinder, pumping means for feeding fuel oil to the said valves, means for actuating the said valves, air starting means, a single manually operable controller having movement in two directions, and separate operative connections respectively between said controller and said pumping means, air starting means and valve actuating means, whereby movement of the controller in either direction will set all said means for operation.

57. In an internal combustion engine of the Diesel type embodying power cylinders and pistons and scavenging cylinders and pistons, an atomizer valve associated with each power cylinder, pumping means for feeding fuel oil to the said valves, means for actuating the said valves, air starting means, and a single manually operable controller having separate operative connections respectively with said pumping means, said valve actuating means and said air starting means, whereby all of the said means may be set for operation by the one controller.

58. In an internal combustion engine of the compression type embodying a plurality of power and scavenging cylinders and their coöperating pistons, a separate passage for establishing communication between adjacent power and scavenging cylinders, a fluid actuated valve in each passage normally maintaining its passage closed, a compressed air source of supply having conduit connections with all of said passages, and manually operable means for admitting compressed air from said source into said conduit connections to successively operate the valves and admit starting air to the scavenging cylinders, said valves also operating under air pressure from the scavenging cylinders to admit scavenging air to the power cylinders.

59. In an internal combustion engine of the compression type embodying a power cylinder and piston and a scavenging cylinder and piston, a passage for establishing communication between said cylinders, a compressed air source of supply leading to said passage, and fluid-actuated valve means operating under air pressure from said source to admit starting air to the scavenging cylinder to drive its piston outward and start the engine under air pressure and said valve means also operating under impulse of air from the scavenging cylinder upon the return stroke of its piston to admit scavenging air to the power cylinder.

60. An internal combustion engine embodying a plurality of units each unit having a power cylinder and piston and a scavenging cylinder and piston, a valve-controlled passage for establishing communication between the scavenging cylinder of one unit and the power cylinder of an adjacent unit, a source of compressed starting air, an intercepting valve in said passage for controlling the admission of starting air from said source to the scavenging cylinder and for admitting scavenging air from the latter cylinder to an adjacent power cylinder, a conduit leading from said compressed air source for supplying air therefrom to actuate the said intercepting valve and admit starting air to one of the scavenging cylinders, an auxiliary valve in said conduit for controlling the passage of starting air therethrough, and means operated by a driven part of the engine for actuating said auxiliary valve at regular intervals and thus control the operation of the intercepting valve.

In testimony whereof I have hereunto set my hand in presence of two subscribing witnesses.

LEONARD B. HARRIS.

Witnesses:
MAURICE L. MONROE,
G. W. CARPENTER.